US008977838B1

(12) United States Patent
Mass et al.

(10) Patent No.: US 8,977,838 B1
(45) Date of Patent: Mar. 10, 2015

(54) ARCHITECTURE FOR COOPERATING HIERARCHICAL MICROCODED COMPUTE ENGINES

(75) Inventors: Allen P. Mass, Lisbon, IA (US); John K. Gee, Mount Vernon, IA (US); David W. Jensen, Marion, IA (US); Jeffrey D. Russell, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 975 days.

(21) Appl. No.: 12/896,123

(22) Filed: Oct. 1, 2010

(51) Int. Cl.
*G06F 9/54* (2006.01)
*G06F 9/22* (2006.01)

(52) U.S. Cl.
CPC ........................................ *G06F 9/22* (2013.01)
USPC .......................................... 712/247; 712/246

(58) Field of Classification Search
CPC ................................ G06F 9/22; G06F 9/223
USPC .................................................. 712/246, 247
See application file for complete search history.

(56) References Cited

U.S. PATENT DOCUMENTS 4,050,058 A * 9/1977 Garlic ............................... 712/42
4,527,237 A * 7/1985 Frieder et al. .................. 709/253
6,691,206 B1 * 2/2004 Rubinstein ..................... 711/105
7,376,811 B2 * 5/2008 Kizhepat ........................ 712/15
2009/0228686 A1   9/2009 Koenck
2009/0228693 A1 * 9/2009 Koenck et al. ................ 712/248

OTHER PUBLICATIONS

Sperry et al, "A microprogrammed Signal Processor", Apr. 1981, IEEE International Conference on ICASSP'81, Acoustics, Speech, and Signal Processing, vol. 6, pp. 579-582.*
IEEE, "IEEE 100 The Authoritative Dictionary of IEEE Standars Terms", Feb. 2007, 7th Ed., p. 450-451.*
IEEE Micro-AAMP1 Article "An Advanced-Architecture CMOS/SOS Microprocessor", by David W. Best, Charles E. Kress, Nick M. Mykris, Jeffrey D. Russell, and William J. Smith, published in Aug. 1982, pp. 11-26,IEEE MICRO.

* cited by examiner

*Primary Examiner* — Andrew Caldwell
*Assistant Examiner* — Yuqing Xiao
(74) *Attorney, Agent, or Firm* — Angel N. Gerdzhikov; Donna P. Suchy; Daniel M. Barbieri

(57) ABSTRACT

A nested hierarchical plurality of microcoded compute engines where each successive compute engine is coupled to a source bus and a sink bus of another microcoded computed engine at a different hierarchical level, where one microcoded compute engine may be a replacement of a scratchpad memory or FIFO from a pre-existing design. A communication scheme for communicating between and within various hierarchical layers of microcoded compute engines and a piano roll of bitmapped barrier objects for synchronizing activities of various microcomputer engines.

2 Claims, 27 Drawing Sheets

ARCHITECTURE FOR COOPERATING HIERARCHICAL MICROCODED COMPUTE ENGINES

FIELD OF THE INVENTION

The present invention relates to microprocessors and more particularly to microcoded compute engines and even more particularly to extensible microcoded compute engines.

BACKGROUND OF THE INVENTION

Microprogrammed Machines

In the past, it has been well known to use microcoded microprocessors such as the Advanced-Architecture Microprocessor (AAMP) as described in an article by the same name in the August 1982 issue of IEEE MICRO, which is incorporated herein in its entirety by this reference.

In simplest terms, the control unit of a microprogrammed digital machine comprises a control store and a microsequencer. Typically, the control store (a control store implemented with RAM is a Writable Control Store (WCS)) is a wide memory that contains the microprogram. Each line of code in the microprogram is referred to as a microword or microinstruction. One or more microwords are collectively referred to as microcode.

To access a given microinstruction from the control store, the microsequencer must issue the microaddress associated with the desired microinstruction. It follows that each memory location in the control store contains a microinstruction. We sequence through a series of microinstructions to accomplish some task.

Each microinstruction contains individual fields that directly control a digital machine's primitive data flow and sequencing functions. Consisting of one or more bits each, these fields are known as microorders, microoperations, or microcommands. Representative microcommands for an ALU would be OR, AND, and ADD. If the ALU had eight commands, the ALU microcommand field would be (optimally) 3 bits wide.

Microcommands should not be confused with the more familiar assembly code instructions of processors such as the Pentium and PowerPC. In a microprogrammed processor, execution of an assembly code instruction is accomplished by execution of one or more microinstructions on its behalf.

Microcore

Now referring to FIG. 1, a MicroCore is a microprogrammed compute element that is adaptable across application domains by customizing both logic and microcode while preserving macroarchitectural features such as the control unit and high-level bus structure. The basic MicroCore, generally designated 100 in FIG. 1, comprises a register file and Data-side ALU (DALU) 112 whose operations are directed by instructions emanating from a microcontrol store 120. Microinstruction execution order is controlled by a microsequencer 130.

Basic data flow is from the register file, through the ALUs, and then back to the register file. Referring to the data side 110 of FIG. 1, data from the register files is sourced onto the A and B buses. After passing through the DALU, data is written back to the register file via the C bus. Therefore, data is sourced onto A and B, and sunk from C. Both the register file and ALU source and sink data.

Various types of functional subunits may be attached to the A, B, and C buses. The number of subunits is limited by the width and encoding capability of the control store. In addition, depending on their function, the subunits may or may not have both a data source and a data sink.

For vision processing, the MicroCore has been augmented with a Data Address Generator (DAG) on the left side of UC16 (called MicroCore w/ DAG in FIG. 1), comprising another register file and an Address-side ALU 142 (AALU), as well as additional microfields (AFN, DS, ES, and GS) to control these new resources. On the address side, data is sourced onto the D and E buses, and sunk from the G bus. The dashed line on the left side of the control store feeds the DAG.

Another enhancement is the provision for accessing one or more scratchpad memories via the external buses. Read and write addresses for these memories are provided by dedicated registers (WAx and RAx) in the address-side register file.

Still another enhancement to the basic concept of the AAMP was the provision of a Look-ahead Fetch Unit (LFU) in the AAMP5 sold by Rockwell Collins Inc.

As illustrated in FIG. 28, the AAMP5's Look-ahead Fetch Unit (LFU) is a nanocoded compute engine that is used to autonomously fetch and parse AAMP5 machine instructions (its "assembly instructions") from external program memory. Execution of an AAMP5 machine instruction is realized by the execution of one or more lines of microcode identified by an entry point provided by the LFU. The LFU also provides constant ("immediate") data from the instruction stream. High level LFU control emanates from the AAMP5 micro control store.

LFU microcode is termed "nanocode" for two reasons:
1) To distinguish it from AAMP5 microcode
2) By virtue of the LFU being a much simpler compute engine with respect to the AAMP5.

FIG. 28 has been drawn so as to emphasize the broad similarity between the AAMP5 and MicroCore microarchitectures. The AAMP5 R and W buses correspond to the internal A and B buses of a MicroCore, (FIG. 1) while the AAMP5 writeback bus is similar to the internal MicroCore C bus.

While the AAMP line of microprocessors has been quite successful over the years providing utility in many specialized applications, it has evolved over the years in successive iterations of improvements. Years of research and development went into the several variations of AAMP.

There has been a need in the microcoded microprocessor industry to enhance the flexibility and increase the utility of such processors by decreasing the design effort and engineering time often required in redesigning such existing microprocessors to include increased computational power and functionality.

SUMMARY OF THE INVENTION

The present invention is directed toward providing such improvement in microprocessors and particularly in meeting some of the need for the ability to rapidly and efficiently create high performance low power consumption designs.

It is an object of the present invention to increase the computational power of a microcoded processor.

It is a feature of the present invention to include nested hierarchical microcoded compute engines.

It is an advantage of the present invention to provide for ease in computational power expansion by nesting a compute engine between the C and B buses or between the E and G buses of the next higher compute engine.

The present invention is intended to achieve the above-described object and include the aforementioned feature, and provide the previously stated advantage.

Accordingly the present invention is:

a system of hierarchical interconnected nested microprocessors comprising:

a first microcoded compute engine;

a first source bus and a first sink bus, each coupled to said first microcoded compute engine;

a loadable micro control store for storing a microorder;

a passive functional unit disposed between said first source bus and said first sink bus; said passive functional unit being addressed by microorders comprising only data and control path primitives;

a second microcoded compute engine disposed in a nested configuration at a lower hierarchy level than said first microcoded compute engine and in parallel with said passive functional unit and coupled to said first source bus and said first sink bus; said second microcoded compute engine having a second source bus and a second sink bus coupled thereto;

said first microcoded compute engine, said passive functional unit, said second microcoded compute engine, said first source bus and said first sink bus all being configured, so that said passive functional unit could be replaced by an expansion microcoded compute engine, in which data exchange between hierarchy levels is through memory and FIFO access microorders that do not differentiate between action upon a passive functional unit and action upon a compute engine.

In the above description of the present invention, a new hierarchy level is created by disposing a microcoded compute engine and a passive functional unit between the sink and source buses of a microcoded compute engine at the next higher hierarchy level, with the possibility of replacing said passive functional unit with yet another microcoded compute engine. This replacement would be to increase the effective computation power of the encompassing hierarchy level.

Having stated that, it is important to note that the present invention does not require a minimum number of either passive functional units or microcoded compute engines at any level of the hierarchy. Replacement of a passive functional unit with a compute engine is intended to provide extra computation power, and it could be the case that, at any given level, the initial system design called for no passive functional unit at all, and only one or more microcoded compute engines are needed at that level. We have motivated discussion of the present invention with the notion of "replacement" to highlight the interchangeability of passive functional units and microcoded compute engines from the standpoint of microorders common to both.

Finally, we note that progression to a lower hierarchy level requires at least one microcoded compute engine at the current hierarchy level. If such were not the case, there would be no sink and source buses for disposition of the lower level compute engine.

DETAILED DESCRIPTION

Microengine Hierarchy

Figure 1:
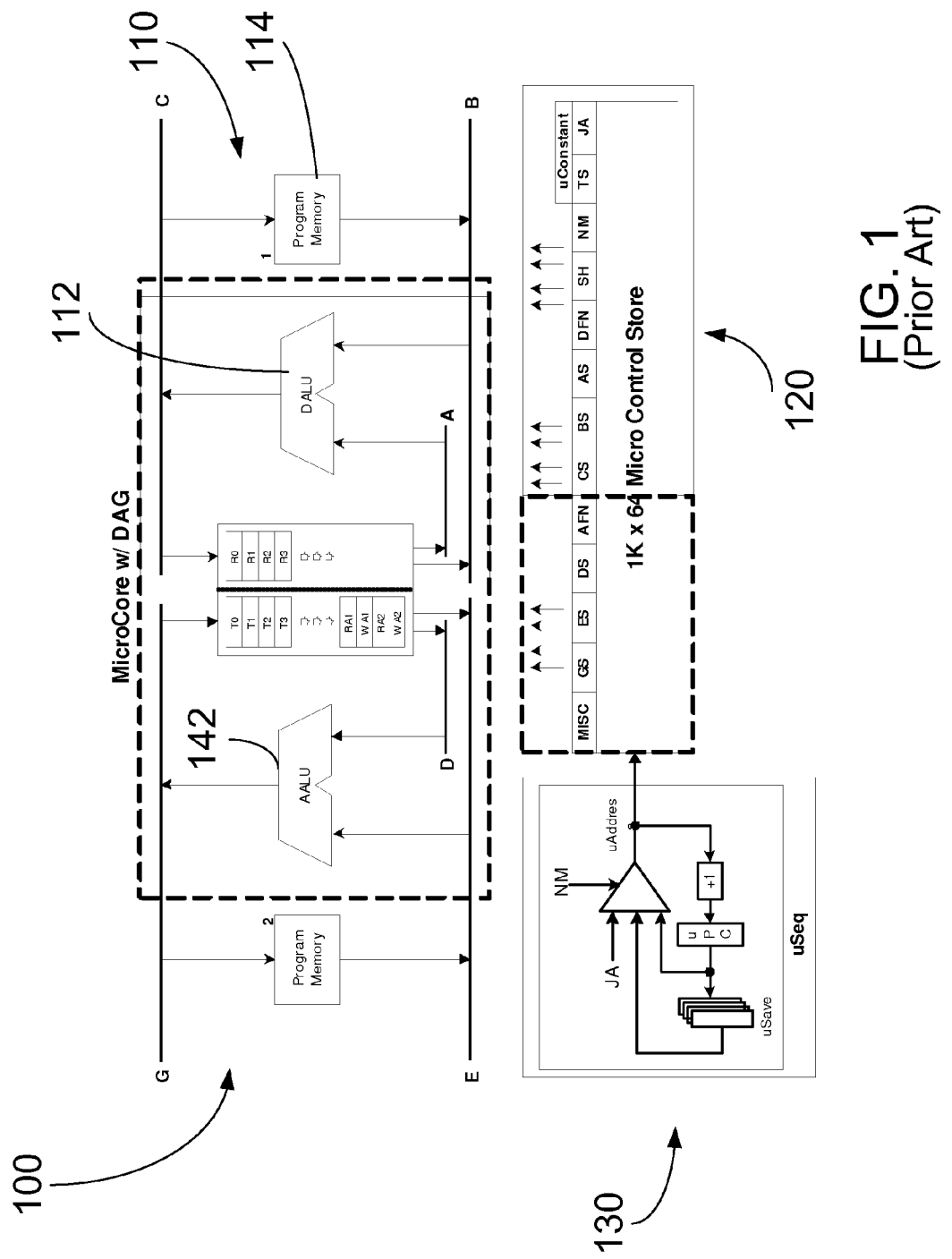
FIG. 1 is a simple block diagram of a MicroCore compute element of the prior art.
Figure 2:
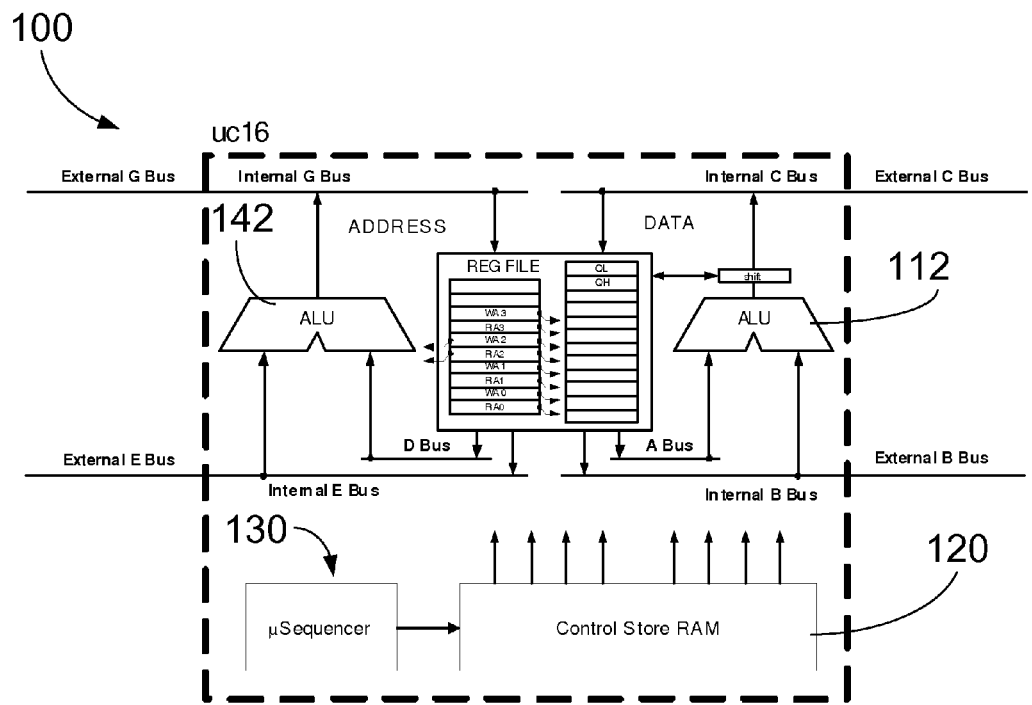
FIG. 2 is a more detailed diagram of a MicroCore compute element of FIG. 1.

Now referring to the drawings, wherein like numerals refer to like matter throughout, and more particularly referring now to FIG. 2, a construction of a microengine hierarchy begins with a closer look at the microcore's architecture. FIG. 2 is a block diagram of the 16-bit processor engine, hereafter referred to as "uc16," that is at the heart of every microcore. (In FIG. 1, uc16 was called the "basic" microcore. 100)

This drawing emphasizes the extension of the B, C, E, and G buses outside of the uc16 block. (Note: no program memory is shown on FIG. 2)

Figure 3:
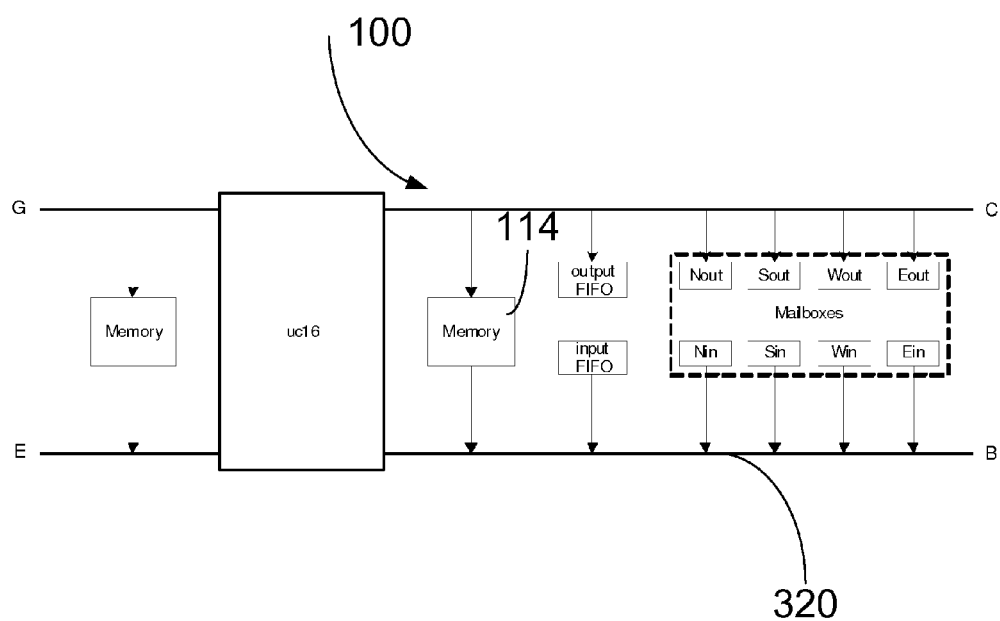
FIG. 3 is a simple block diagram of a MicroCore compute element with various attached resources of the prior art.

In FIG. 3, uc16 becomes a microcore by attaching various resources to the external buses. These resources are meant to be representative. Most microcores have image and scratchpad memories 114, FIFOs for external input and output data, and mailboxes 320 for communication with other microcores.

Simple Array

Figure 4:
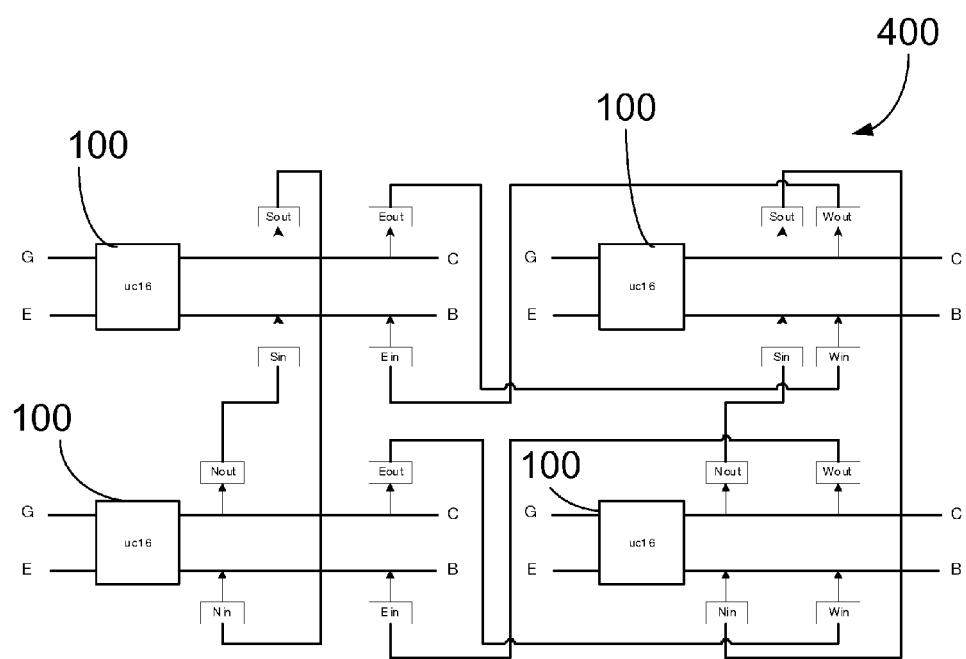
FIG. 4 is a simple block diagram of a flat array of MicroCore compute elements of the prior art.

Now referring to FIG. 4 a flat (i.e., one-level) array 400 of microcores 100 may be constructed by connecting the mailboxes of one microcore to the mailboxes of another, with North to South, South to North, West to East, and East to West, as shown in FIG. 4.

Figure 5:
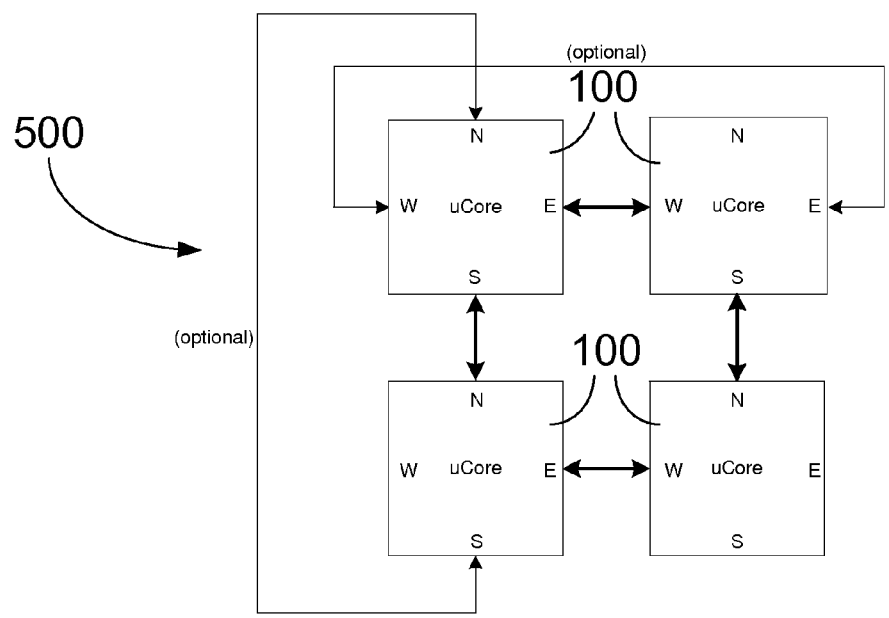
FIG. 5 is a simpler block diagram of a flat array of MicroCore compute elements of the prior art, with an alternate view of mailbox connections.

FIG. 5 is a simpler depiction of this 2×2 microcore array 500 of microcores 100. Where no adjacent mailbox connection is possible, a "wraparound" connection may be made. Two of these optional connections are illustrated in FIG. 5.

Simple Hierarchy

Figure 6:
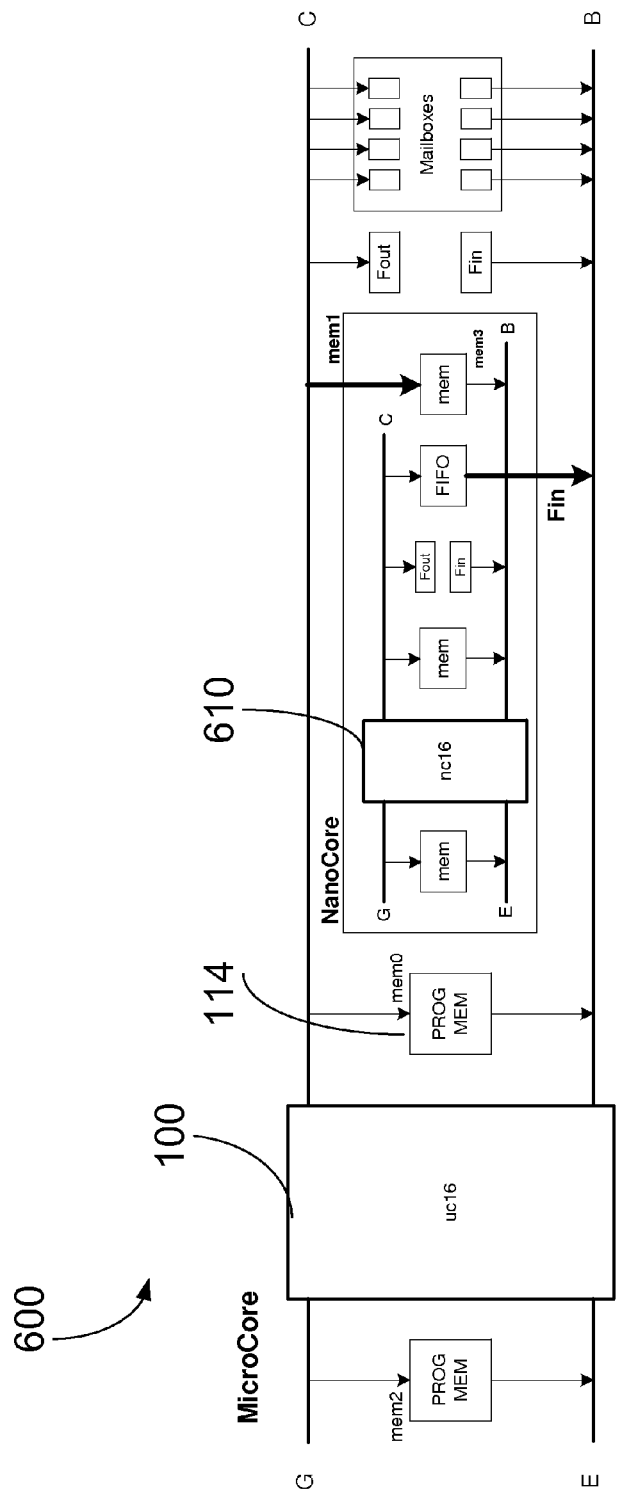
FIG. 6 is a simple block diagram of a two-stage nested array of MicroCore compute elements of the present invention.

We create a simple computational hierarchy by hanging a "nanocore" off the B and C or E and G buses of one of our microcores, as shown in FIG. 6. A nanocore is typically a less complex version of a microcore. By less complex, is meant smaller buses, fewer registers, fewer functional units, fewer microorders, smaller and narrower control store, etc. When referring to a nanocore, we speak of nanoorders, nanocode, and so on.

A nanocore is treated by its controlling microcore as just another functional unit akin to a scratchpad memory or FIFO. For example, to read a value from scratchpad memory #0, add 5 to that value, and write the result to scratchpad memory #1, the following line of microcode might be used:
CNSTA READ0B Add WRT1C 5

Suppose now that what the microcore 100 views as memory 1 is actually the nanocore 610 of FIG. 6. This means that the WRT1C microorder, which would normally write to the microcore's scratchpad memory 1, writes instead to memory 3 of the nanocore. The nanocore, in turn, may read this value by executing a READ3B nanoorder. Similarly, the nanocore FIFO is written by the nanocore with nanoorder FIFOC and may be read by the microcore using microorder FIFOB.

Figure 7:
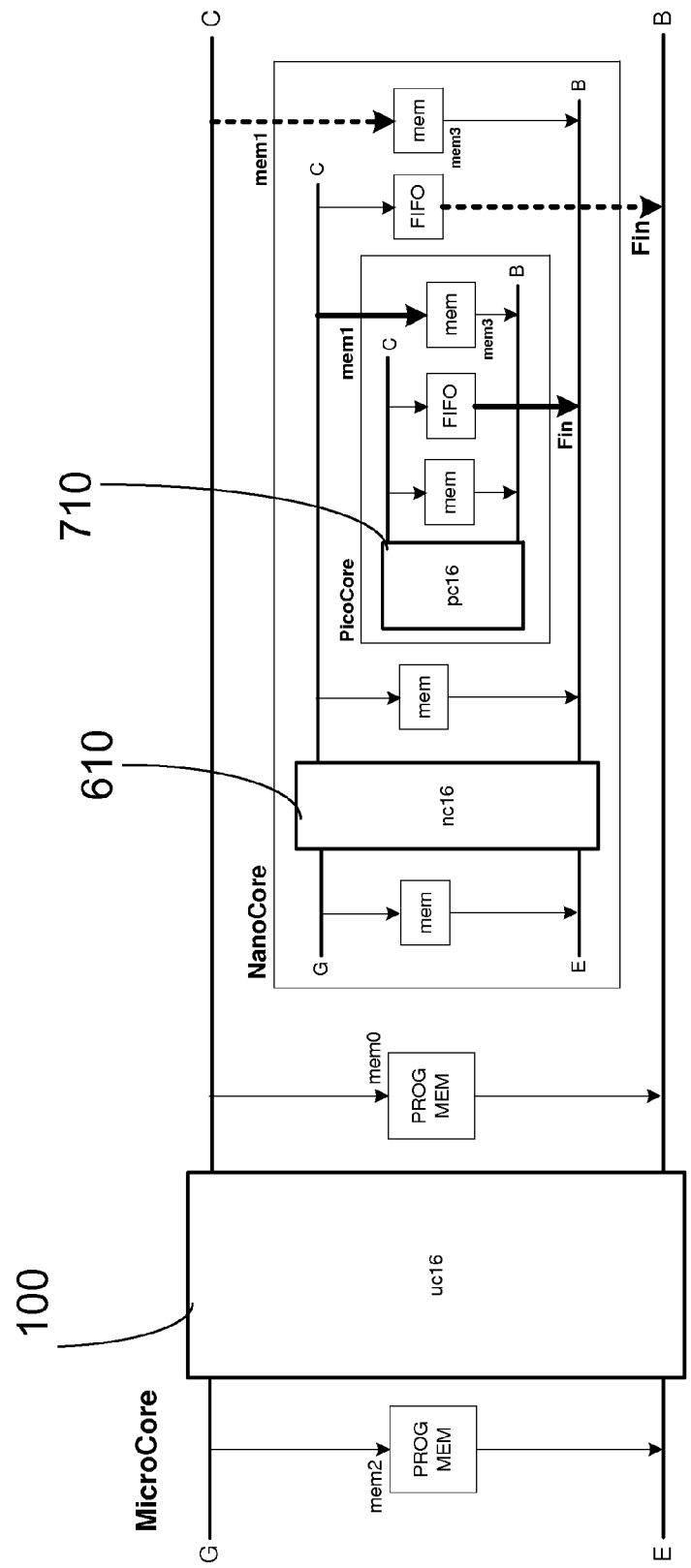
FIG. 7 is a simple block diagram of a three-stage nested array of MicroCore compute elements of the present invention.

Using the scheme just described, compute engines may be nested to any depth. Now referring to FIG. 7, there is shown a 3-deep hierarchy with a microcore 100, nanocore 610 and picocore 710. The nanocore/picocore pair (w/bold bus interconnects) is interconnected in a manner analogous to the microcore/nanocore pair (w/ dotted line bus interconnects), and the picocore becomes a "functional unit" of the nanocore. As might be expected, a picocore would typically be even simpler than a nanocore, and we speak of picocores having picoorders and picocode. Note: a picocore could be larger and more complex than the nanocore which could be larger and more complex than the microcore.

By virtue of being in the middle level of the hierarchy, the nanocore 610 transmits and receives data to and from both the microcore 100 and picocore 710. In communicating with the microcore, the nanocore performs some task on behalf of the microcore 100, so it receives data to process and then returns the result. Conversely, in communicating with the picocore 710, the nanocore 610 sends data for the picocore 710 to process and then consumes the result. In this basic hierarchical arrangement, the picocore 710 serves the nanocore 610 and the nanocore 610 serves the microcore 100.

Above it has been explained how to construct a simple flat array with mailboxes and a simple hierarchy with B/C bus interconnects. We now discuss various combinations of these processor arrangements.

Intra-Level Mailbox Connections

Arrays of microcores are typically interconnected with mailboxes. This was discussed in the section above labeled SIMPLE ARRAY and is a straightforward concept. An important aspect of the present invention is the possibility of fully or partially interconnecting nanocores and/or picocores using the same type of mailboxes.

Figure 8:
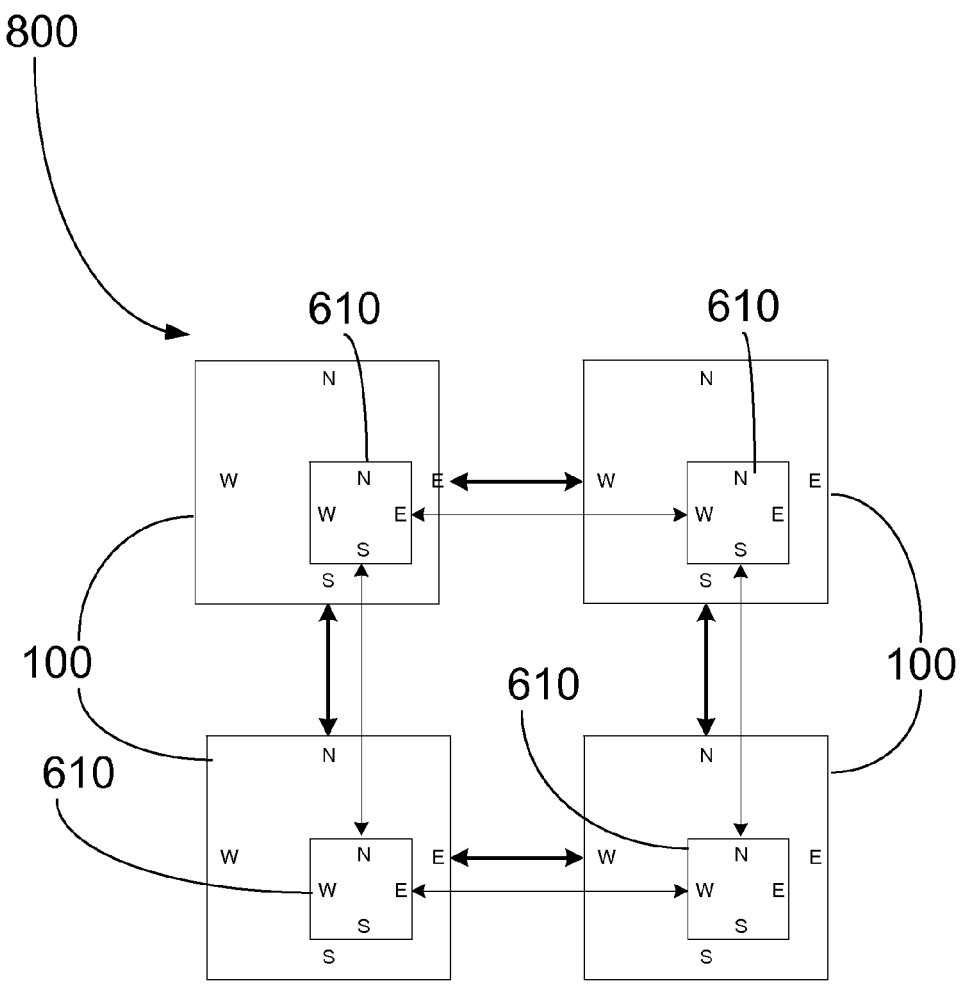
FIG. 8 is a simple block diagram of mailbox single-level interconnection for 2×2 array of two-stage nested compute engines of the present invention.

If we suppose that each microcore in 2×2 array (such as that shown in FIG. 5) has an embedded nanocore 610, and each of these nanocores has N/S/W/E mailboxes, then those nanocores may be interconnected in their own 2×2 array at a lower hierarchical level (bold interconnects in FIG. 8). We end up with a combination 800 of two "parallel" 2×2 arrays.

Every level of a hierarchy may be interconnected in this fashion, allowing us to have an arbitrary number of parallel m×n arrays of processing cores. Note also that not all hierarchical levels need have mailbox connections, nor do all cores within a given level need be interconnected. For example, given 3 levels of hierarchy, level 1 could be fully interconnected, level 2 not connected at all, and level 3 just have N/S connections.

Inter-Level Mailbox Connections

Figure 9:
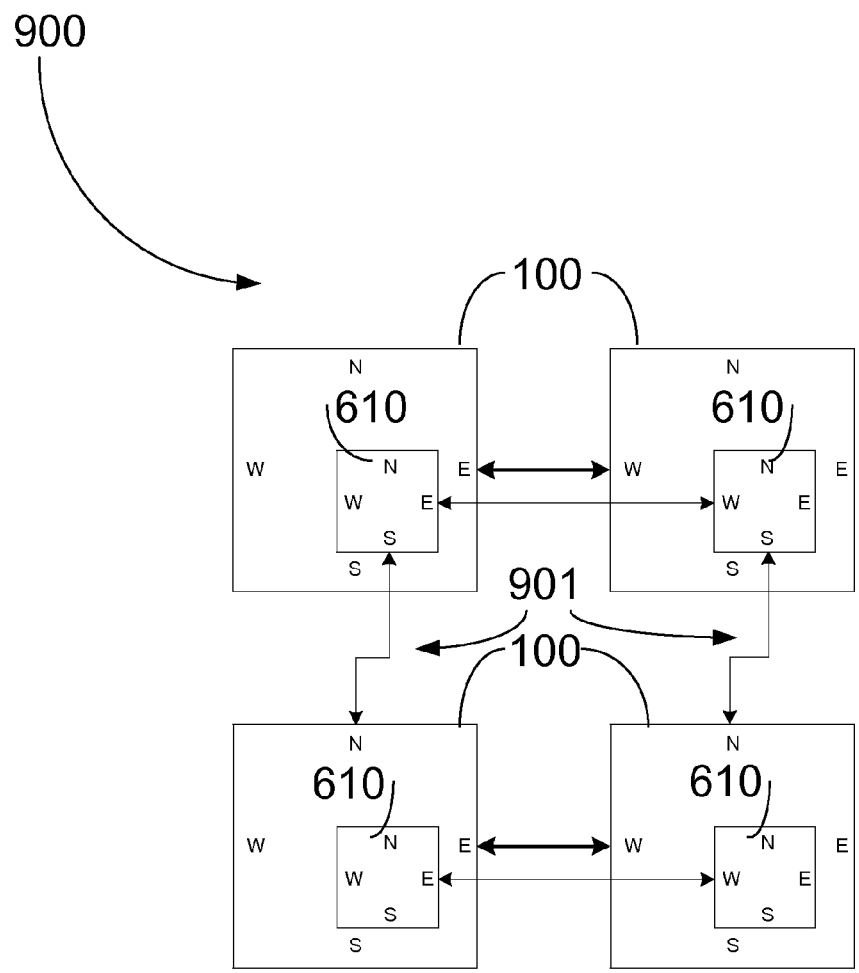
FIG. 9 is a simple block diagram of mailbox two adjacent level interconnection for 2×2 array of two stage nested compute engines of the present invention.

Mailboxes of one hierarchy level may communicate with mailboxes at a different level of hierarchy. In FIG. 9, there is shown a new mailbox configuration, generally designated 900 in which the North/South microcore connections of FIG. 8 have been replaced with nanocore to microcore mailbox connections 901 (South mailbox of a nanocore connected to the North mailbox of a microcore).

Figure 10:
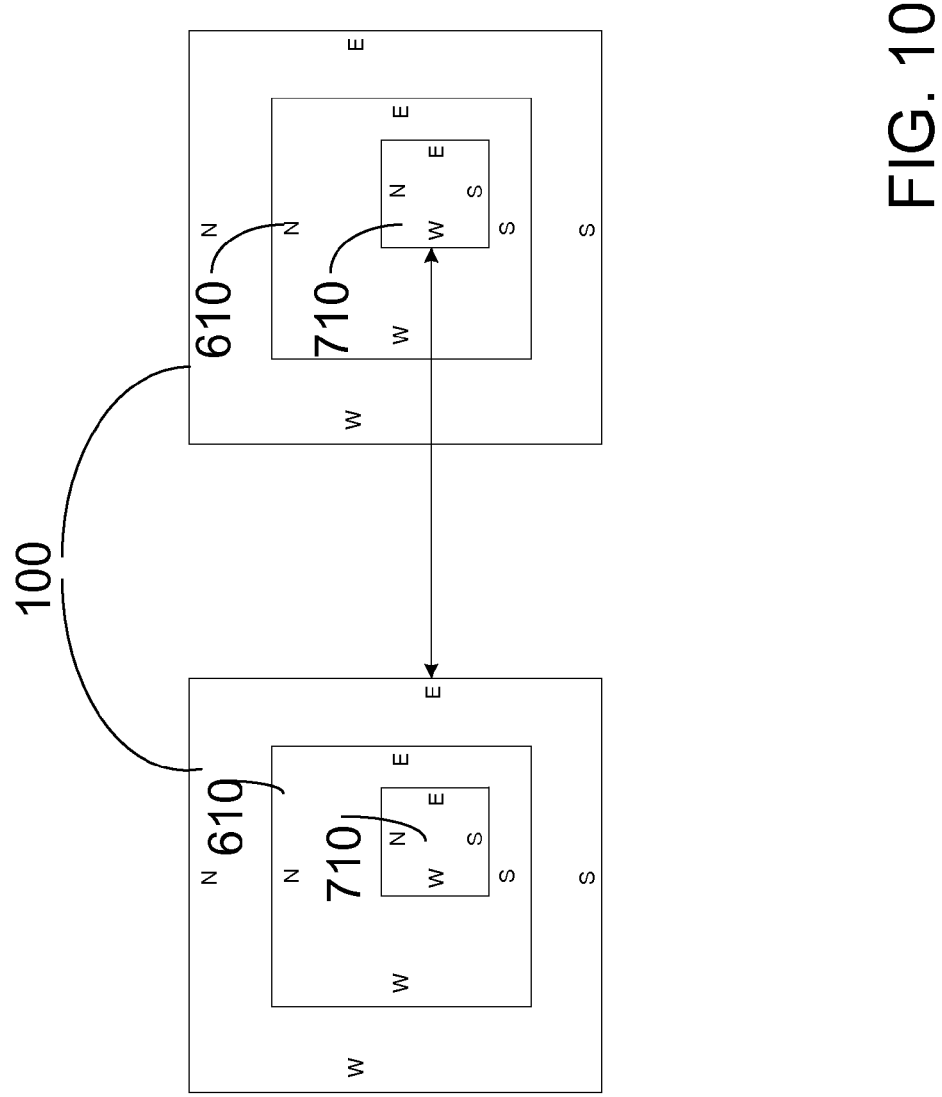
FIG. 10 is a simple block diagram of multi-non-adjacent-level mailbox interconnection for 2×2 array of three stage nested compute engines of the present invention.

Mailbox connections may skip any number of hierarchy levels, as shown in FIG. 10, where the picocore 710 in one array position is directly connected to a microcore 100 at another array position.

In summary, given arrays of processing cores nested to any level, mailboxes of any core may be connected to mailboxes of any other core, regardless of a given mailbox's hierarchy level.

Multiple Embedded Cores

Figure 11:
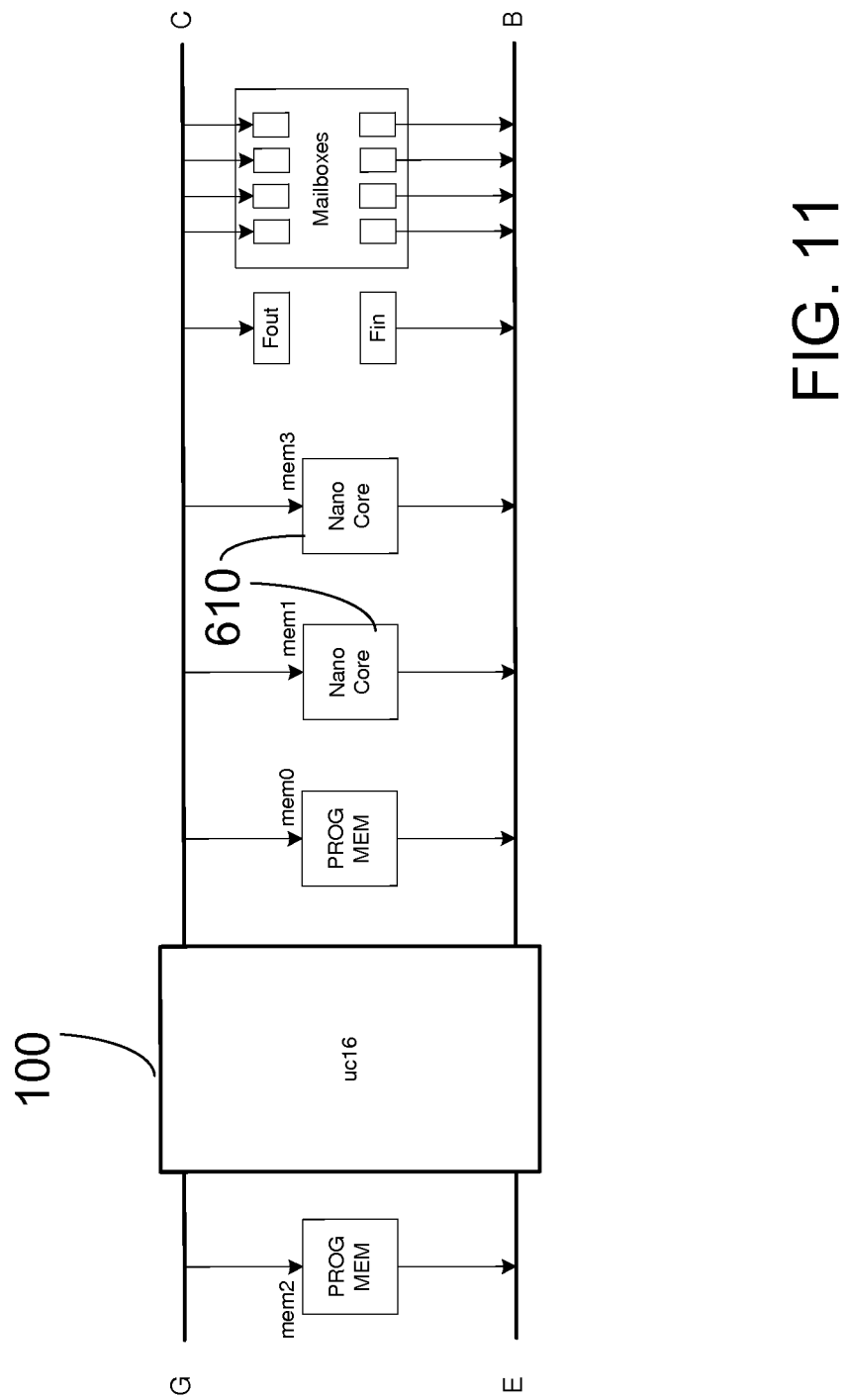
FIG. 11 is a simple block diagram of a dual two stage nested array of MicroCore compute elements of the present invention.

Multiple processing cores may be embedded in a host core. This is illustrated by FIG. 11, where two memory units have been replaced by nanocores 610.

The number of cores embedded in another core is limited only by the width of the host core's control store. As before, the embedded cores' mailboxes may be connected to other mailboxes at any array position and hierarchy level.

Relative Complexity of Cores

Previous sections have referred to embedded cores (nano, pico, etc.) as being less complex as we traverse deeper into the hierarchy. Architecturally, this is typical, but not required. That is, any processing core, no matter where embedded or what its array position, may be of arbitrary complexity. The sole expectation for a core is that it is microprogrammable and has source/sink buses (C/B) as described in Section MICROCORE.

Representative Applications

Parallel Intra-Level Connected Arrays

1. Microcore array served by an embedded DMA nanocore array.
2. Microcore array with a communications security protocol enforced by an embedded nanocore array.

Data Flow

Germane to construction of the processing architecture discussed previously is the ability to substitute an active processing core for a host core's passive functional unit (typically a memory) without changing the microorders used to communicate with that unit. In other words, interface microorders view a functional unit as some form of memory whether or not that is its sole or intended purpose.

The interface logic architecture that enables this easy substitution is discussed in the following sections.

Memory Interface Logic

As discussed in Section MICROCORE, scratchpad memories may be attached to a microcore's external C/B and/or G/E buses. Communication to these memories is controlled via dedicated logic and read/write pointer registers on the address side of the microcore, as illustrated in FIG. 12.

Figure 12:
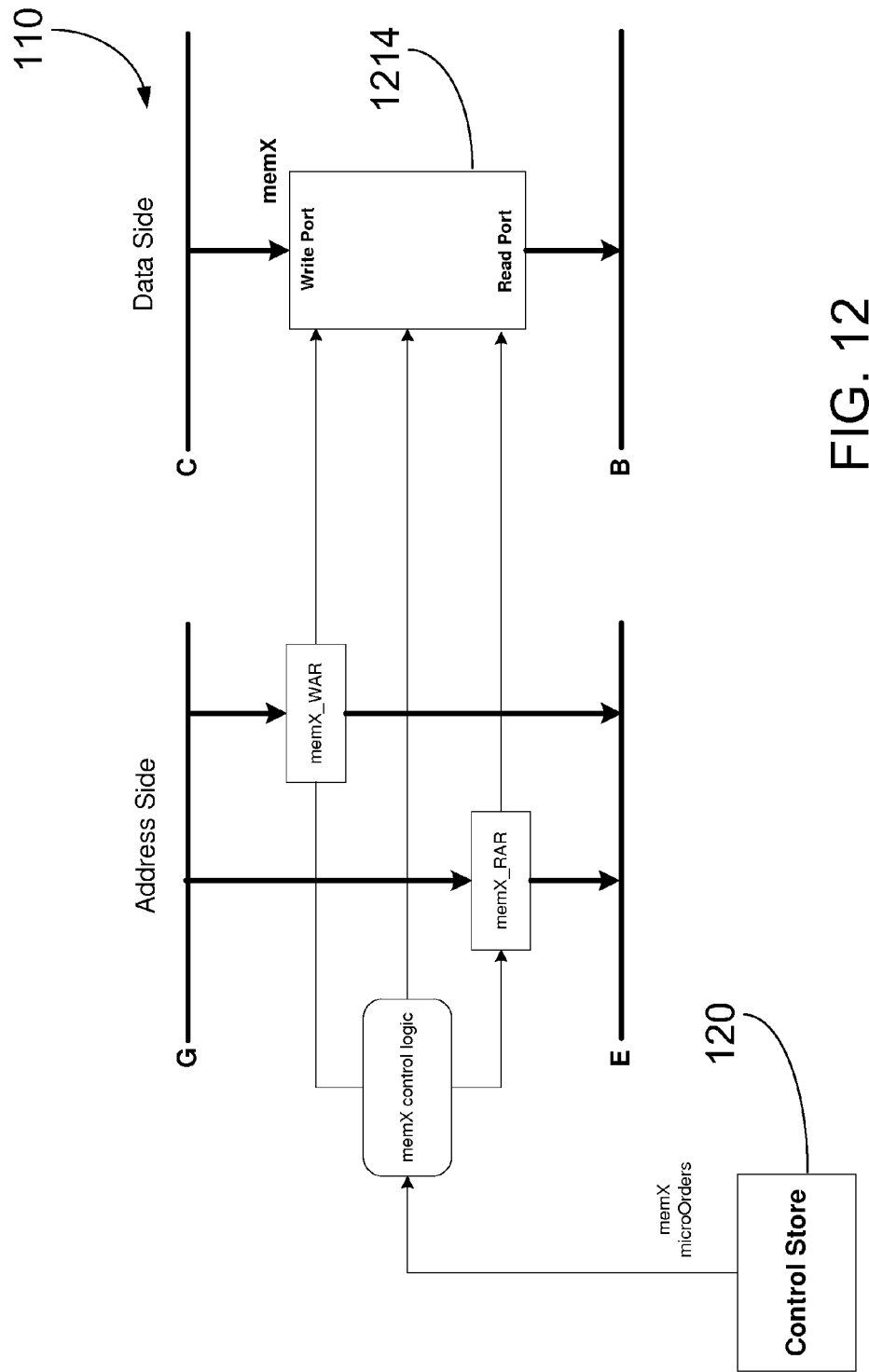
FIG. 12 is a simple block diagram of scratchpad memory communication scheme of the present invention.

A typical microcore has up to 4 scratchpad memories referred to as mem0, mem1, mem2, and mem3 (represented by memX in FIG. 12). Dedicated microorders for each memory allow memory reads, writes, and address pointer (WAR and RAR) updates. The microcore's address side/data side separation allows address pointer updates to proceed in parallel with data side activities (thus facilitating one-clock memory update loops).

In FIG. 12, the memory block proper, memX, 1214 is a "plug-in" component of the microcore. Architecturally, the interface pointers and logic belong to the microcore, with the precise nature of the attached plug-in not being important so long as the plug-in responds to read and write microorders in the expected manner. In summary, the microcore scratchpad memory interface must be viewed as distinct from the memory block proper, and it is this architectural dichotomy that allows us to substitute a nanoengine for the memory block.

Memory-Based Data Exchange

Having substituted a nanoengine for a memory block, it remains to define the rules of behavior for data exchange between the encompassing microcore and the nanoengine.

1. Writing one or more data words to the nanoengine should initiate some sort of nanoprocessing.
2. Processing results are accessible via the block's read port.
3. Different write addresses may be associated with different nano-algorithms.
4. If rule 2 is followed, one would expect to read the results from different read addresses.
5. There are several possibilities for synchronizing read access to the processing results:

A. If the "processing" is performed by a combinatorial logic block, the result should be available by the next clock, so no synchronization is needed.
B. The microcore is "held" until the result is ready.
C. After writing to the nanoengine, the microcore performs some other task in parallel until receiving a microinterrupt from the nanoengine.
D. After writing to the nanoengine, the microcore performs some other task in parallel while periodically polling the nanoengine by reading from a dedicated read address.
E. After writing to the nanoengine, the microcore waits on a barrier (see Section SYNCHRONIZATION).

FIFO Interface Logic

Figure 13:
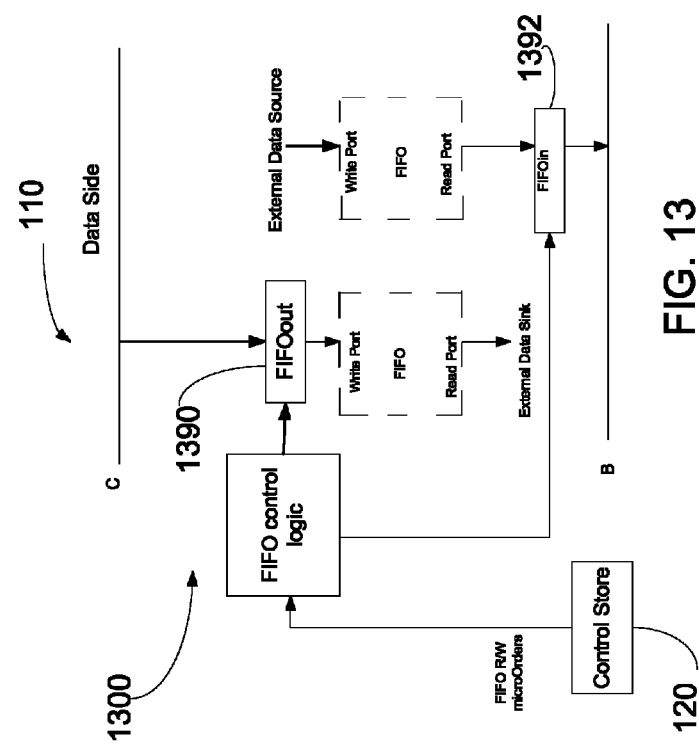
FIG. 13 is a simple block diagram of a FIFO interface logic scheme of the present invention.

FIG. 13 illustrates a typical microcore FIFO interface 1300 using the so-called "FIFOout" 1390 and "FIFOin" 1392 logic blocks. The FIFOout logic is an interface to a FIFO's write port, while FIFOin interfaces to a FIFO's read port. As was the case with memory blocks, FIFO interface logic belongs to the microcore, with the FIFO itself serving as a plug-in.

Figure 14:
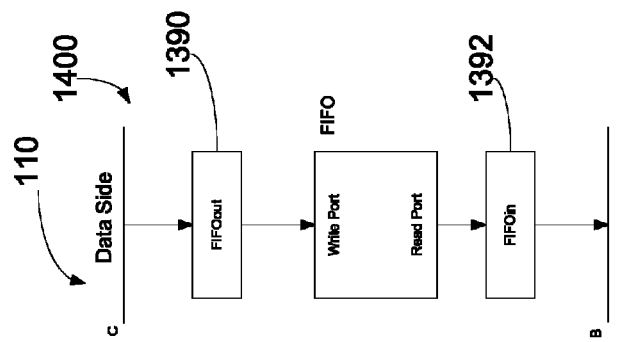
FIG. 14 is a simple block diagram of an alternate FIFO interface logic scheme of the present invention.

Typically, the FIFO port opposite that attached to the microcore is connected to an external data source or sink, which affords the microcore a communication channel to outside resources. FIG. 14 shows another configuration 1400, which doesn't seem very useful unless we imagine substituting a nanoengine for the FIFO.

FIFO-Based Data Exchange

Figure 15:
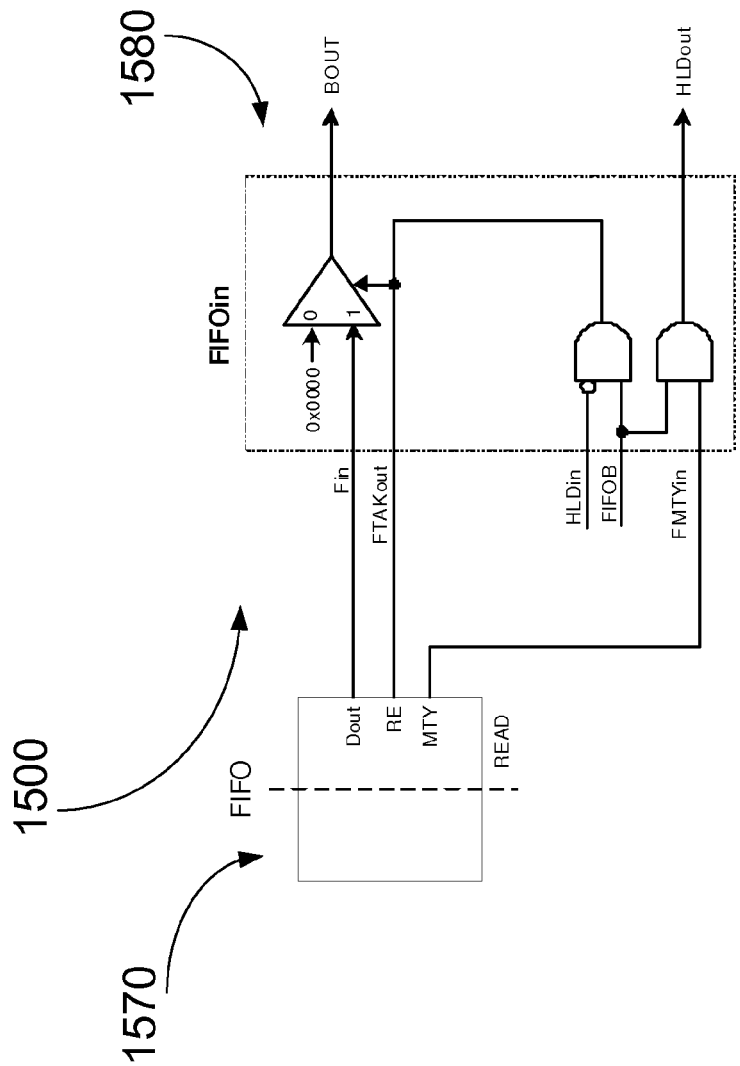
FIG. 15 is a simple block diagram of FIFO IN based data exchange scheme of the present invention.
Figure 16:
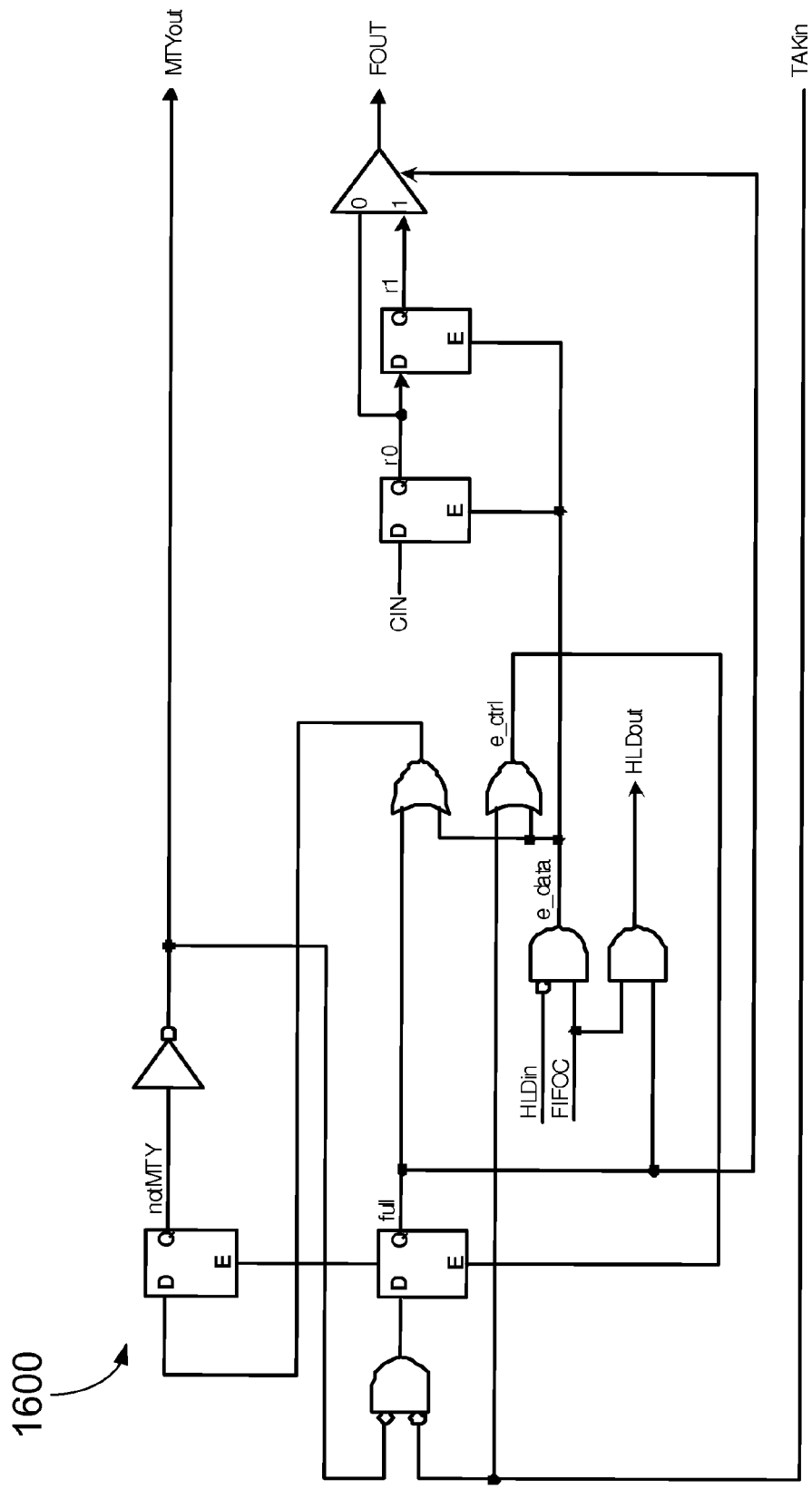
FIG. 16 is a simple block diagram of FIFO OUT based data exchange scheme of the present invention.

Nanoengine for FIFO substitution is intuitively more satisfying than the memory block replacement discussed in Sections MEMORY INTERFACE LOGIC and MEMORY-BASED DATA EXCHANGE, since no addressing is involved and the FIFO interface necessarily provides "hold" logic (Scratchpad memories are usually synchronous RAMs with single-clock read and write access). FIG. 15 and FIG. 16 are representative implementations of the FIFOin and FIFOout logic blocks.

Now referring to FIG. 15 there is shown a FIFOin data exchange scheme, generally designated 1500 where FIFOin 1580 provides an interface to a FIFO's read port 1570. If the microcore has issued a FIFO read microorder (such as FIFOB in FIG. 15) and the FIFO 1570 is not empty, FIFO data is sourced onto the B bus. If the FIFO is empty and we're trying to read it, HLDout becomes active and the microcore stalls until the FIFO is not empty.

Now referring to FIG. 16 there is shown a FIFOout scheme generally designated 1600 which is the interface to a FIFO's write port. Since FIFOout provides a two-word data buffer (a "miniFIFO"), its operation is more complex than FIFOin's.

We start with empty r0 and r1 buffer registers, and TAKin inactive (meaning there's no attempt to read from the miniFIFO). If the microcore issues a write FIFO microorder (such as FIFOC in FIG. 16), data is written to r0 and the nonMTY FF is set. If a subsequent write is attempted without an intervening TAKin, r1 is written and the full FF is set. A subsequent write attempt will now cause HLDout to be active and the microcore will stall until TAKin is asserted.

Figure 17:
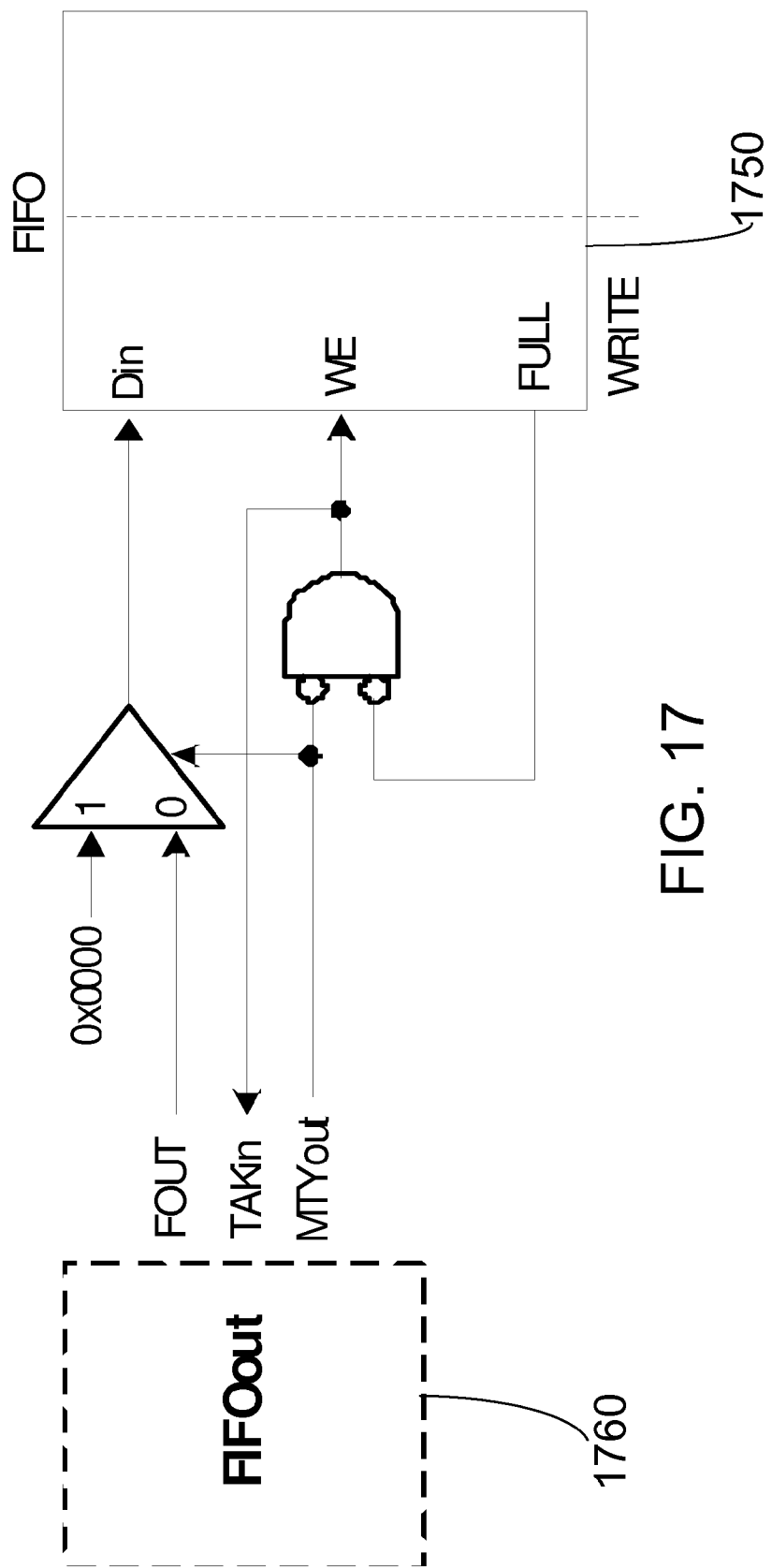
FIG. 17 is a simple block diagram of FIFO OUT interface to a FIFO Write Port scheme of the present invention.

Now referring to FIG. 17, TAKin will be asserted by the write port of a non-full FIFO, where FIFOout 1760 has been interfaced to a FIFO's write port 1750. If the FIFO is not full and FIFOout's miniFIFO (r0 and r1) is not empty, TAKin is asserted and a data word written to the FIFO.

The preceding description of FIFOin and FIFOout shows how easy it is to view a nanoengine as a FIFO in which the empty and full flags serve as indicators of a processing engine's "state of completion." Therefore, having substituted a nanoengine for a FIFO, the rules of behavior (listed below) for data exchange between the encompassing microcore and the nanoengine are simpler (and thus more gratifying) than those for memory block substitution.

1. Writing one or more data words to the nanoengine initiates nanoprocessing.
2. Processing results are accessible via the block's read port.
3. Read access to the processing results is automatically synchronized, since the FIFO "empty" flag may be used as a processing completion flag, and a microcore is automatically held if it attempts to read from an empty FIFO.

We note in passing that FIFO-interface-based data exchange may occur at the same or different hierarchy levels.

Mailbox-Based Data Exchange

Mailboxes were discussed in the section on MICROENGINE HIERARCHY. Since a mailbox is simply a shallow in/out FIFO pairing, FIFO-related nanoengine interconnect and substitution approaches are equally applicable to mailboxes. For example, a nanoengine could be connected between the South_In port of one microcore and the North_Out port of another microcore, which would allow some kind of pre- or post-processing on the data moving between those two microcores. Furthermore, these interconnects can skip hierarchy levels, as discussed in the section on INTER-LEVEL MAILBOX CONNECTIONS.

Hybrid Data Exchange (or, When is a Memory Really Like a FIFO?)

Communication with a nanoengine via memory access microorders need not imply that there is an "addressable" memory living between the microcore and nanoengine. For example, the RAR and/or WAR for that memory could be ignored if FIFO-like behavior is preferred. Better yet, FIFO-like behavior could be inferred for some address ranges but not for others.

Synchronization

In this section we present a flexible synchronization method for our cooperating hierarchy of microcores.

Barriers

Barriers are synchronization objects used to block and release two or more processing threads, and are a well-known signaling mechanism in the domain of high-level operating systems.

To use a barrier, one must create a barrier object and define which threads constitute a "quorum" for that barrier. Once a barrier is created, members of its quorum may "wait_for" it. If a thread waits on a barrier, the operating system blocks its execution until all member threads of that barrier's quorum have also performed a wait_for on the barrier. In other words, after the final thread does a wait_for, all threads of the quorum in question are released simultaneously by the operating system. Release of all quorum threads also "clears" the quorum, thus preparing the barrier object for another round of wait_fors by the same group of threads.

The following subsections describe how the barrier concept may be applied to a group of cooperating microcores.

Bit-Mapped Barriers

For a microcoded environment, a barrier object comprises bit mapped "release" and "quorum" registers of arbitrary width. When a microcore waits for the barrier, its bit in the release register is set. The quorum register identifies the microcores that belong to the barrier's quorum, with a set bit identifying the corresponding microcore as a member. If the release register=the quorum register, all microcores have checked in and are immediately released. At the same time, the release register is reset.

Figure 18:
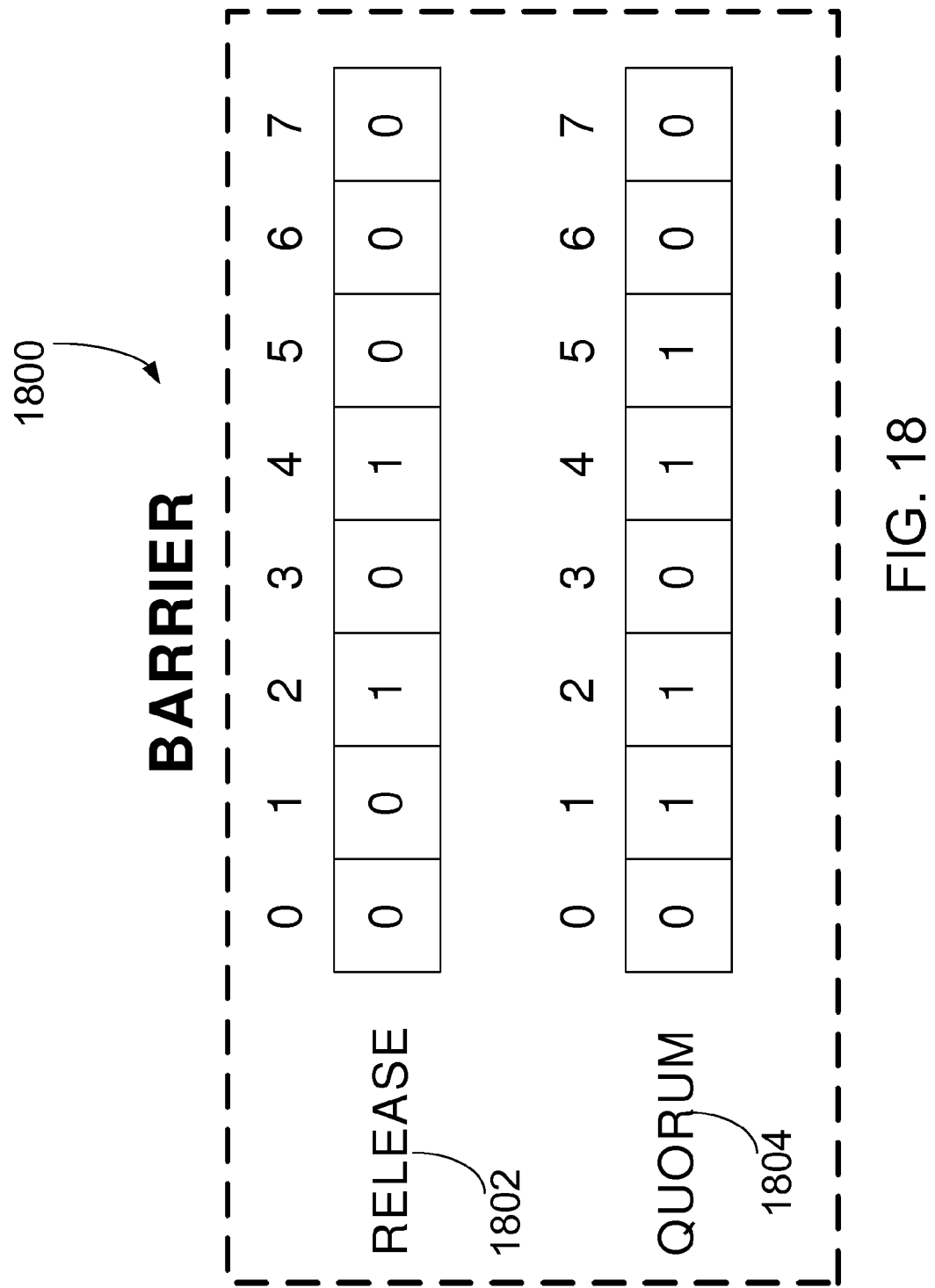
FIG. 18 is a representation of bit mapped release and quorum registers.

In FIG. 18, there is shown a barrier object generally designated 1800 which includes microcore ids 1, 2, 4, and 5 forming a quorum 1804 on the barrier object 1800, and microcores 2 and 4 are blocked, as indicated in the release 1802. As soon as microcores 1 and 5 do their wait_fors, all microcores will be released and the release register will be cleared to all zeros.

Figure 19:
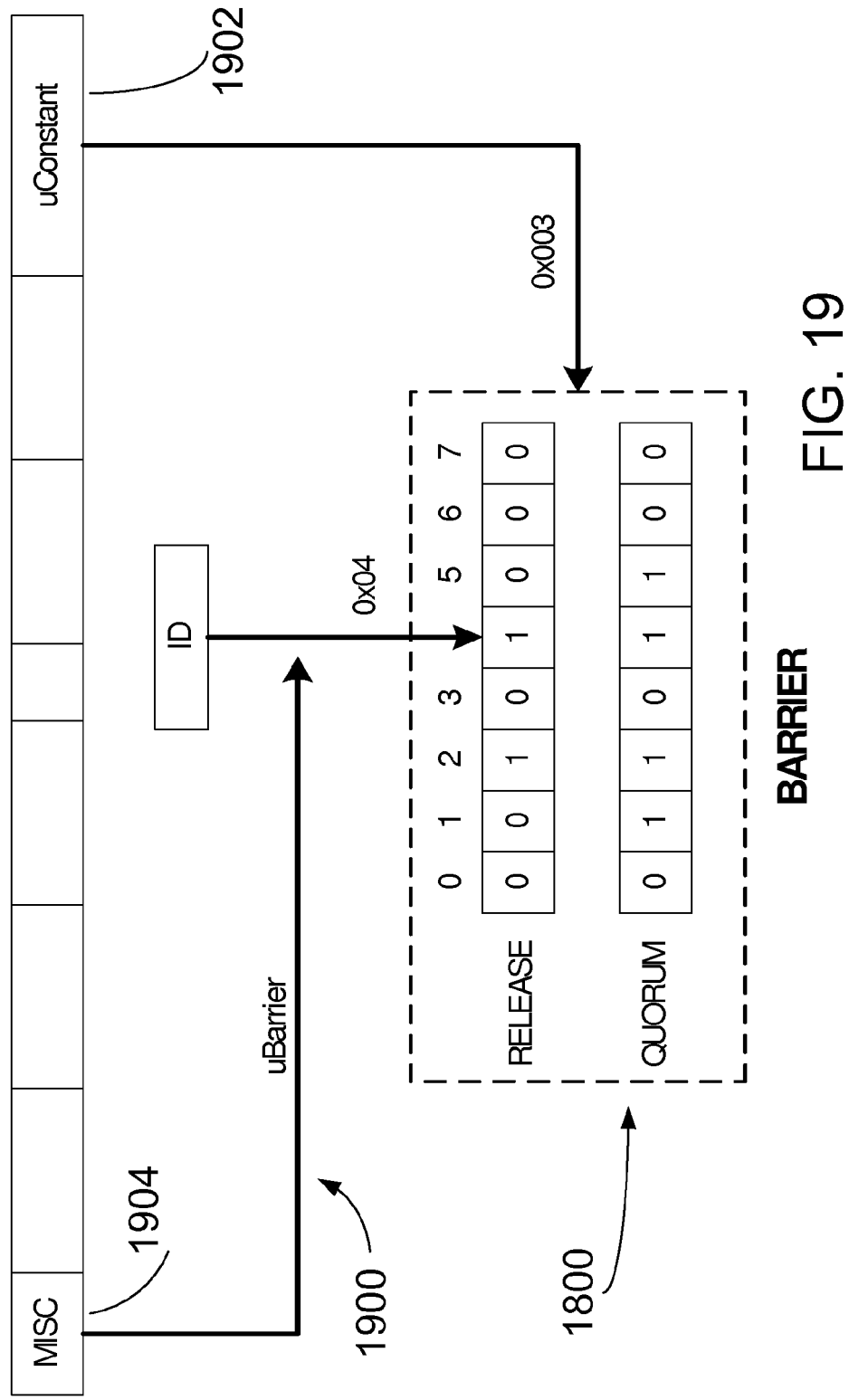
FIG. 19 is the representation of bit mapped release and quorum registers, of FIG. 18 and associated control and data paths.

A microcore performs a wait_for on a barrier by executing a microorder. Now referring to FIG. 19 there is shown a configuration, generally designated 1900 which includes associated with that microorder a pointer to the barrier register pair and a microcore id. In FIG. 19, the microword's microConstant field 1902 is used as the barrier pointer, and the uBarrier microorder is sourced from the Misc microfield 1904. The id (=4) is read from the microcore's ID register. Bit 4 in the barrier's release registers is set as a result of the microConstant, uBarrier microOrder, and microcore ID.

Interpretation of Release Bits

Barriers may be nested by allowing a bit in a barrier's release register to be set by virtue of another barrier being released. If barriers are "nested" in this manner, logic must be provided to determine whether or not the "inner" barrier (that is, the barrier whose release sets an "outer" barrier's release bit) should be released immediately. The other choice is to hold the inner barrier until one or more of the outer barriers in the hierarchy are released.

Nesting of barriers suggests a powerful extension to the interpretation of release bits, namely, the possibility of associating the output of any combinational or sequential logic with one or more release bits. This is equivalent to equating a "quorum" with some arbitrary set of preconditions. Representative preconditions are listed below.

1. Barrier wait_for (the "original" intent)
2. FIFO full and empty flags
3. Timer alarms
4. Expired countdowns
5. A particular finite state machine event
6. Input discrete Henceforth, "member" of a quorum may refer to a satisfied precondition as well as a microcore performing a wait_for.

Barrier Scope

Release bits may be mapped to preconditions at any level of a microcore hierarchy in a heterogeneous fashion. In other words, a single quorum can refer to a mix of preconditions from different hierarchy levels. Obviously, if this is done, the barrier in question must be global in scope relative to the hierarchy levels involved. It follows that a barrier's scope should be limited to the levels represented in the quorum. One implementation approach would be to build scoping into the barrier pointer addressing decode logic.

Barrier Release Events

Waiting on a barrier is meant to be a "blocking" action, and the suggested way to do this in the microcore environment is with "hold" logic like that described in Section DATA FLOW.

This implementation is straightforward, because waiting on a barrier that has not achieved quorum is like trying to read from an empty FIFO. For example, executing UBARRIER on a barrier without quorum will result in a Hold just like executing a FIFOB on an empty FIFO (doing a wait_for that results in a quorum will NOT hold the microcore in question).

Achieving barrier quorum is a release event and, as described previously, unblocks the quorum's microcores. Another release action would be to force quorum microcores to execute a particular sequence of microcode in response to achieving quorum.

In this approach, doing a wait_for would NOT block a microcore. Release bits would be set as before, but the quorum microcores would continue executing until quorum is achieved, at which point each microcore would be vectored to a jam microaddress associated with the barrier in question. The "jam" approach allows microcores to make progress on some other task while waiting for quorum conditions to be satisfied.

It is possible to mix blocks and jams in one barrier.

Piano Roll

Figure 20:
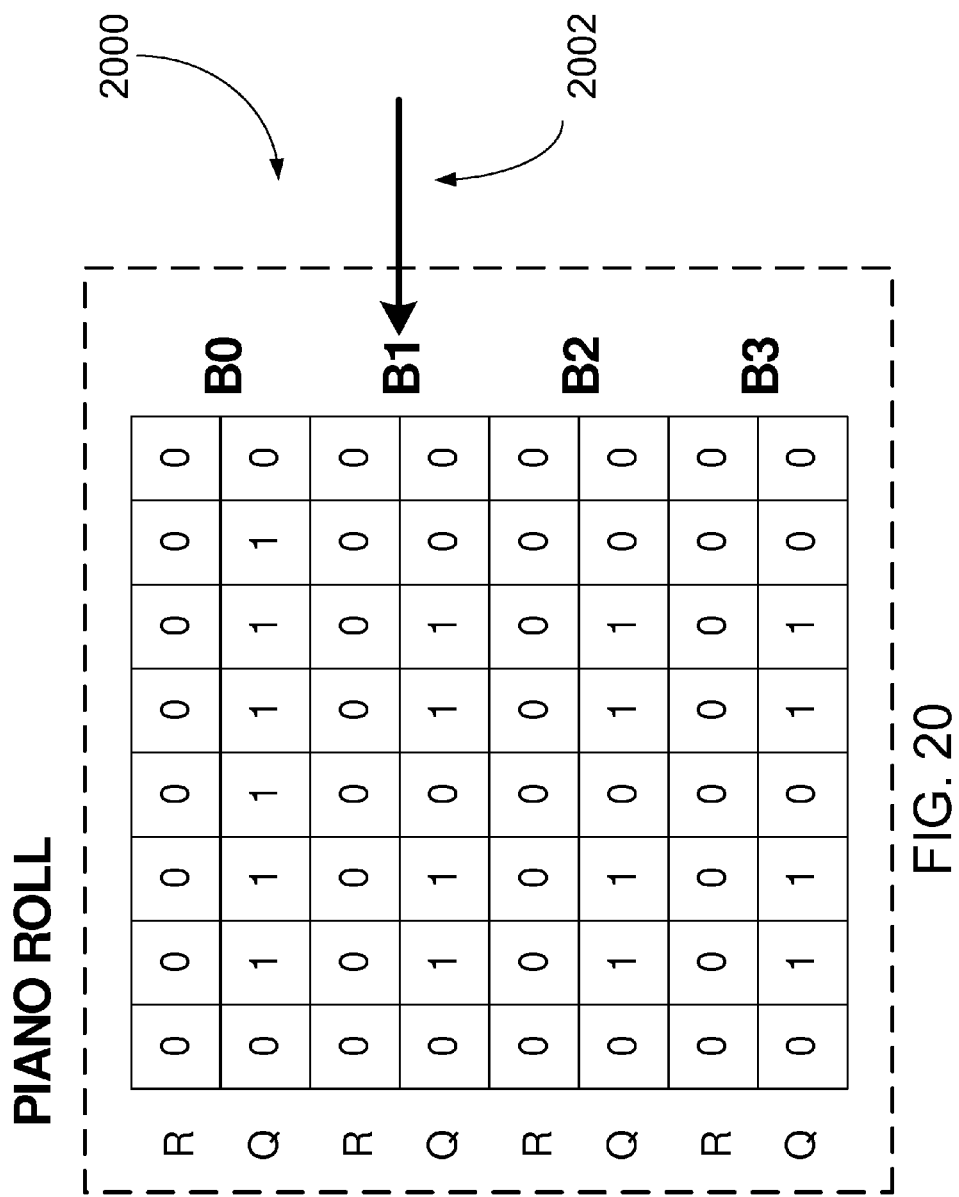
FIG. 20 is a sequential progression of barrier object in one data structure arranged in a fashion that resembles a piano roll.

One way to construct a complex control scheme in a microcore hierarchy is to group a sequential progression of barrier objects into one data structure, as shown in FIG. 20. The resulting data structure, generally designated 2000, resembles a piano roll, in that the 1s and 0s in the quorums are like the holes in a piano roll, which enforce when and if certain keys are pressed.

When a quorum is achieved and the microcores released, the barrier pointer is automatically advanced to the next barrier in the piano roll. In FIG. 20 the pointer 2002 would move from barrier B1 to barrier B2 (B0 follows B3).

Barrier quorums in a piano roll are typically, but need not be, different. Furthermore, the piano roll's scope must be as broad as the most global barrier quorum. As before, any mix of hierarchy layer and level is possible, as well as jam and hold protocols.

JPEG2000 EBCOT Tier 1 Processing

Section NANOENGINE FOR BIT PLANE CODER presents a nanoengine accelerator for JPEG2000 EBCOT Tier 1 processing. This section contains background material for that example.

Figure 21:
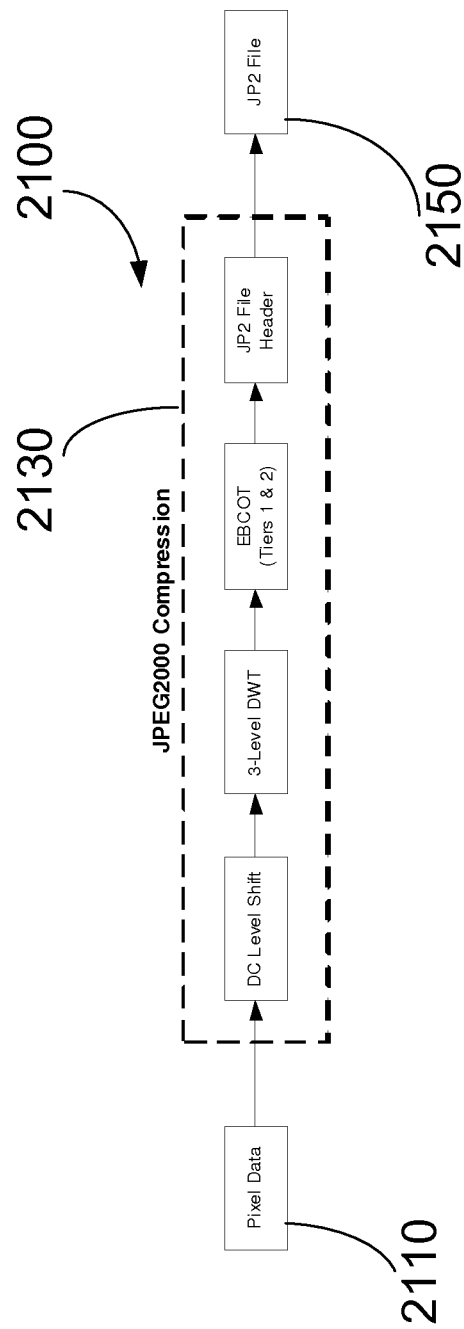
FIG. 21 is a JPEG 2000 data flow chart of one embodiment of the present invention.

Depending on options selected, there are several types of JPEG2000 data flow. For the purpose of this discussion, the data flow of FIG. 21 is representative. The input to the JPEG2000 compression algorithm 2130 is raw pixel data 2110 and the output is a JP2 file 2150. In FIG. 21, four main stages of JPEG2000 processing are identified: DC level shift, Discrete Wavelet Transform (DWT), Embedded Block Coding with Optimal Truncation (EBCOT), and generation of the JP2 file headers. Our current concern is with EBCOT Tier 1.

Figure 22:
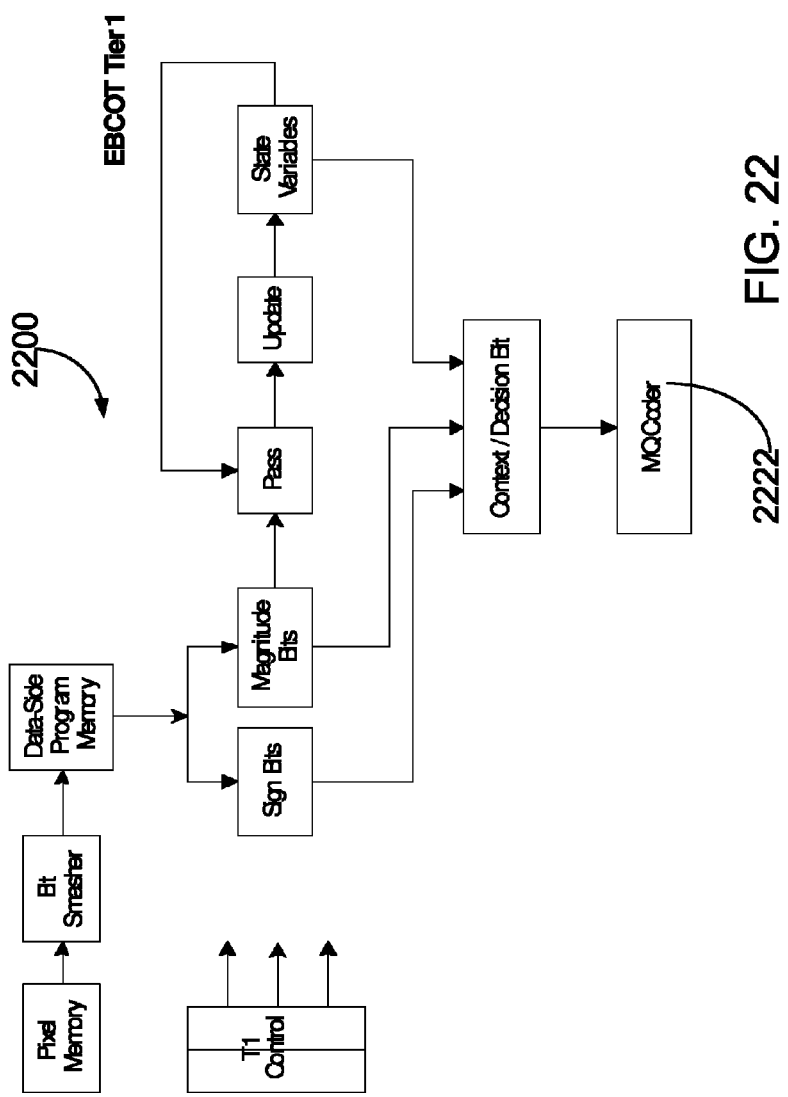
FIG. 22 is a representation of phases of EBCOT Tier 1 processing of one embodiment of the present invention.

FIG. 22 depicts a scheme, generally designated 2200 the various phases of EBCOT Tier 1 processing. Before Tier 1 processing may commence, the output data produced by the DWT must be "smashed" into bit planes. The bit planes are stored in the data-side program memory and are further decomposed into bit and magnitude information before being passed to Tier 1.

There are two parts to Tier 1 processing: bit plane coding functions pass/update and arithmetic (MQ) coding 2222. The bit plane coder outputs a 6-bit context/decision pair based on image data and state information derived from previous bit processing. The arithmetic coder, in turn, outputs a stream of bytes based on the context and decision bits from the bit plane coder.

Figure 23:
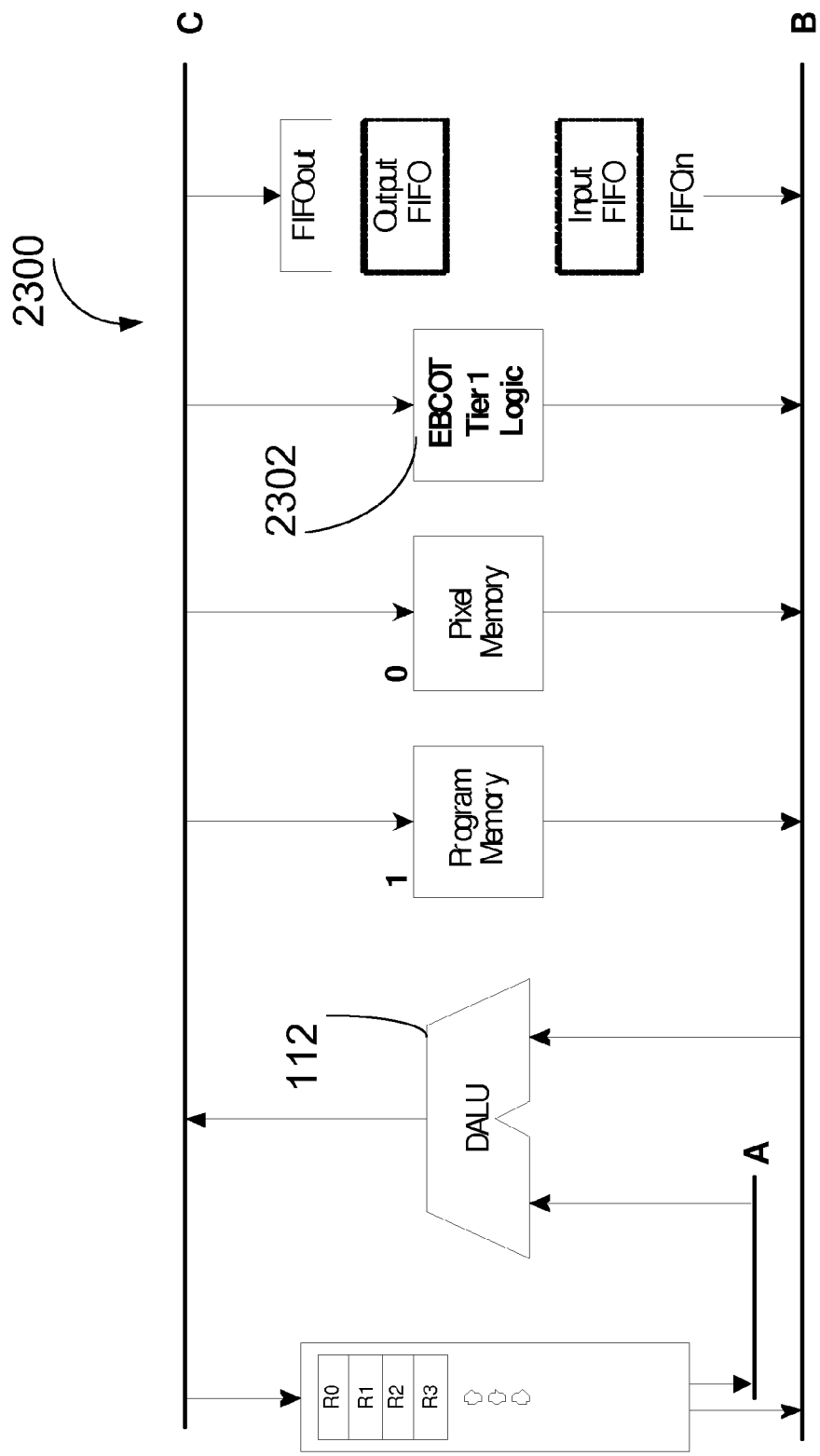
FIG. 23 is a simple block diagram of a MicroCore platform with an EPCOT Tier 1 Logic element coupled between the C and B buses.

Due to the intensely bit-oriented nature of EBCOT processing, a naïve implementation on the MicroCore platform would be computationally prohibitive. Now referring to FIG. 23, a specialized EBCOT logic block 2302 was added to form a new configuration, generally designated 2300. Also shown in FIG. 23 are the pixel memory and input/output FIFOs and DALU 112.

Figure 24:
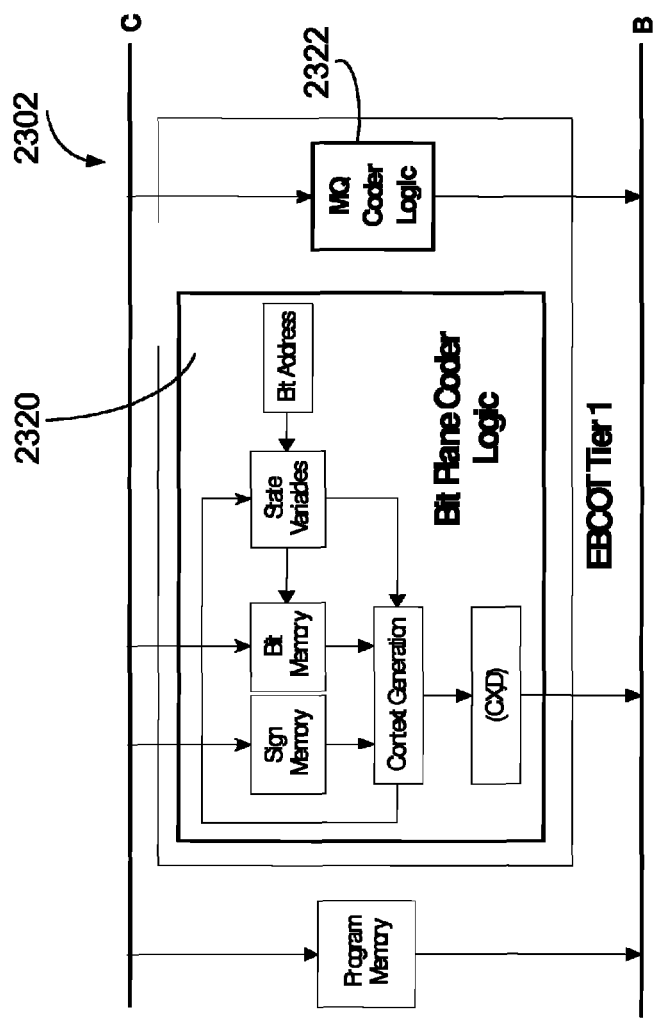
FIG. 24 is a detailed representation of the EBCOT Tier 1 logic block of an embodiment of the present invention.

FIG. 24 provides more detail for the EBCOT logic block 2302, which includes a bit plane coder logic block 2320. Specialized memory is provided for sign data, magnitude data (bit memory), and the state variables, and context/decision bits (CX,D) are generated based on the current state of these memories. The (CX,D) bits are passed to the MQ Coder 2322 via the B and C buses. All Tier 1 processing is under microprogram control (uSeq and Micro Control Store in FIG. 1).

Figure 25:
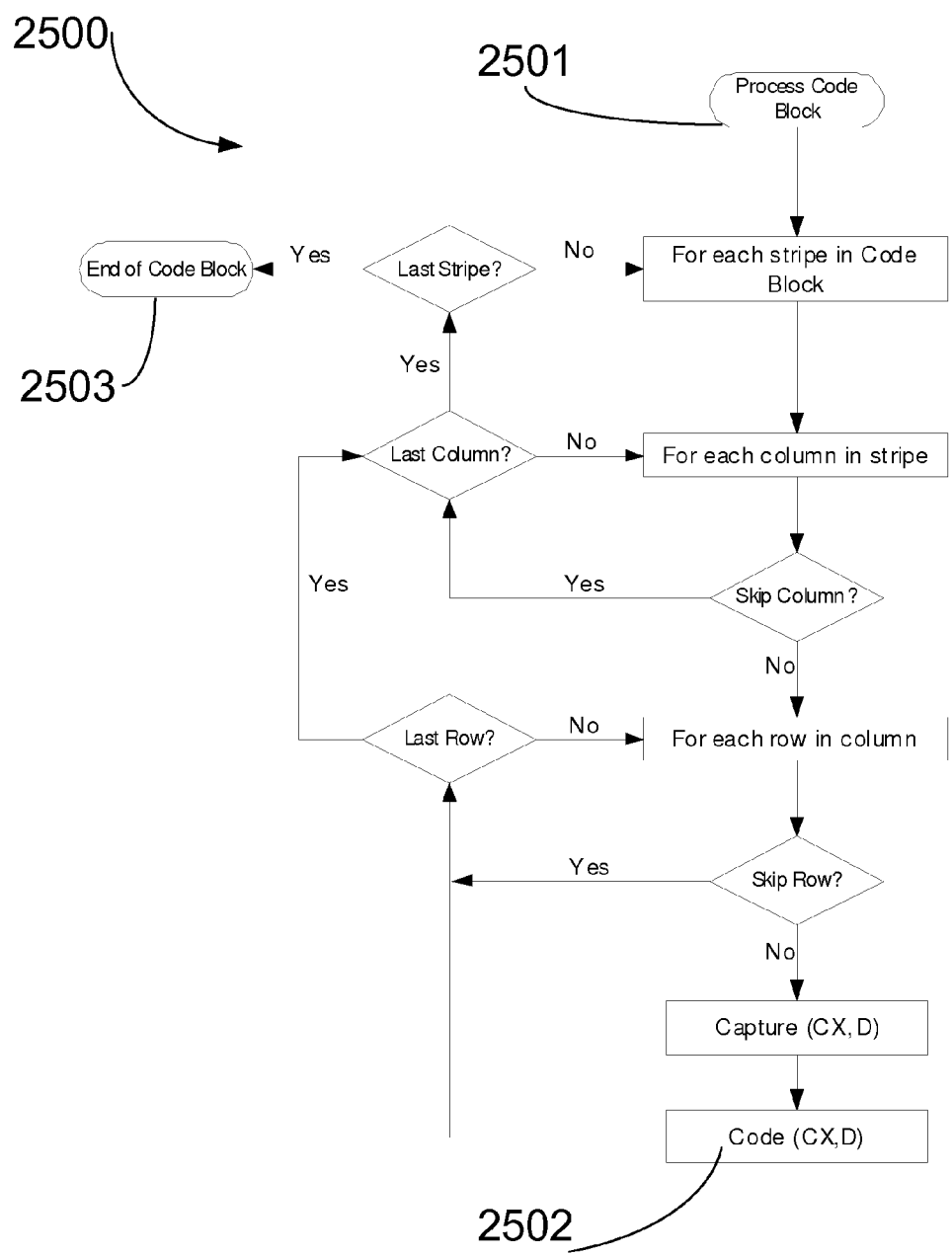
FIG. 25 is a flowchart diagram depicting a Tier 1 process of the present invention.

Now referring to FIG. 25, there is shown a process, generally designated 2500 for control for Tier 1 processing. Pixel data is processed one code block at a time, the process starting at location 2501 where each code block comprises a 16×16 array of pixels. The code block is further divided into (4) 16×4 stripes, with each stripe having 16 columns and 4 rows.

Stripes are transferred one at a time from program memory to the sign and bit memories in the Tier 1 logic block. Once a stripe is resident in the Tier 1 logic block, it is processed one column at a time as detailed in FIG. 25. The MQ coding stage (Code (CX,D) 2502 produces the actual encoded byte stream. The process ends with location 2503.

Nanoengine for Bit Plane Coder

Figure 26:
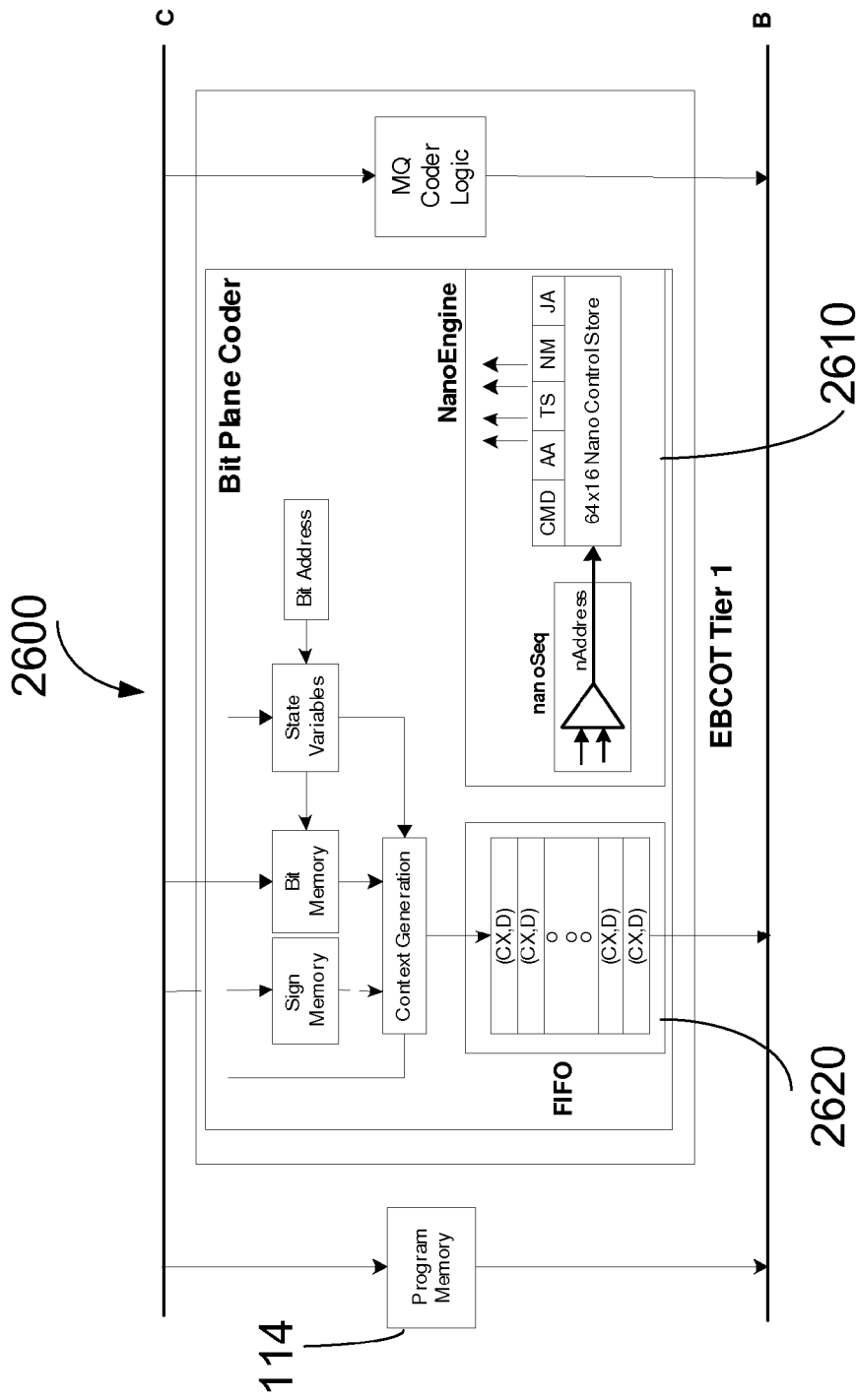
FIG. 26 is a detailed representation of an embodiment of a nanoengine bit plane coder of the present invention.

Now referring to FIG. 26, the appeal of a nanoengine for bit plane coding is based on several observations:

1. A considerable number of clock cycles are expended on both bit plane coding and MQ coding.
2. The context/decision pairs are processed by the MQ Coder in order and one at a time.
3. Generation of (CX,D) pairs is independent of the MQ Coder; i.e., any number of (CX,D) pairs can be processed before being MQ coded.
4. MQ coding may proceed in parallel with bit plane coding.

To take advantage of this parallel processing opportunity, we add a "NanoEngine" 2610 and "(CX,D)-FIFO" 2620 to the EBCOT logic block 2600. The NanoEngine 2610 generates (CX,D) pairs and the FIFO 2620 buffers the (CX,D) pairs for subsequent use by the MQ Coder.

As discussed in previous sections, the NanoEngine exists at a lower hierarchical level of the MicroCore, and is a miniaturized version of the microsequencer and micro control store from FIG. 1. The NanoEngine idles until directed (this direction is in the form of a uOrder from the MicroCore) to begin processing stripe data that has been loaded into the sign and bit memories by the higher level microprogram. Nanoprocessing then proceeds autonomously until the entire stripe is traversed.

In the meantime, the higher level microprogram performs MQ coding on the (CX,D) pairs being written to the FIFO by the NanoEngine. MQ coding progresses until the NanoEngine enters an idle state, at which point the MicroCore microprogram transfers another stripe to the EBCOT logic block and kicks off the NanoEngine once again.

Figure 27:
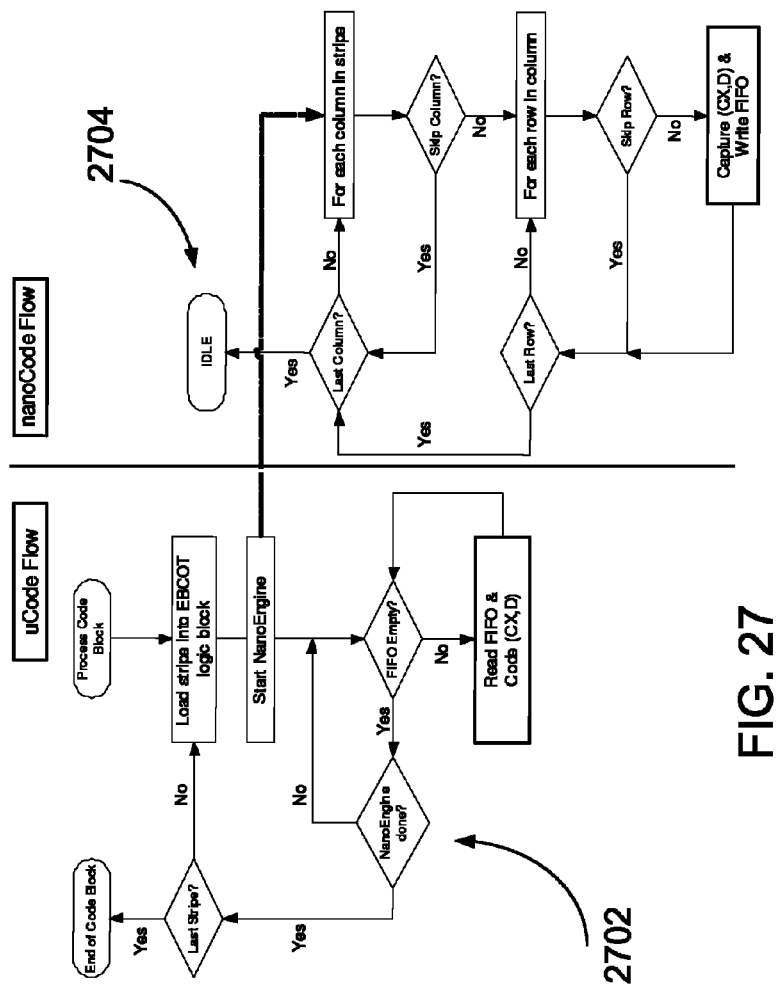
FIG. 27 is a parallel processing flowchart associated with the nanoengine bit plane coder of FIG. 26.
Figure 28:
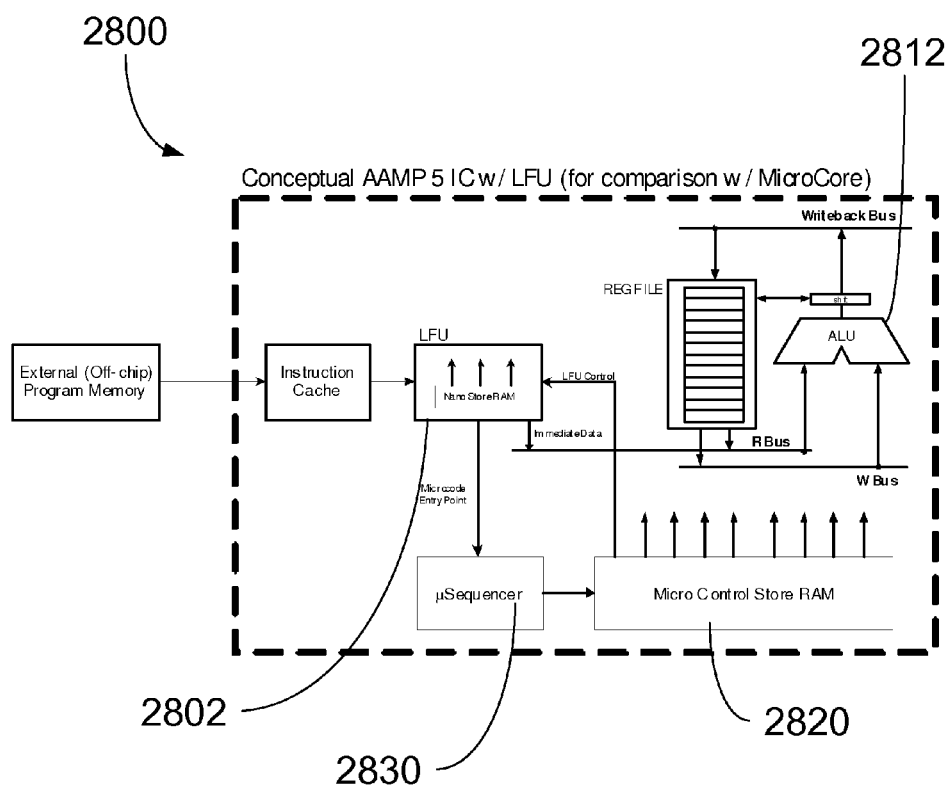
FIG. 28 is a view of portions of an AAMP5 with a look-up fetch unit of the prior art.

The net effect of this microarchitecture is to parallelize MQ and bit plane coding so that the Bit Plane Coder does not have to wait for the MQ Coder after the generation of each (CX,D)

pair. As shown in FIG. 27, the microcode process 2702 has two basic activities: load stripe data into the EBCOT logic block and then MQ code the (CX,D) pairs read from the interface FIFO. Coincident with this processing, the NanoEngine process 2704 waits for stripe data to be loaded, traverses the stripe columns and rows, and writes captured (CX,D) data to the interface FIFO.

We emphasize that bit plane coding is performed by the nanoprogram 2704, while MQ coding is performed by the microprogram 2702.

DEFINITIONS

The following terms, when used in the claims, are hereafter defined to have their ascribed meanings:

Microorder shall mean: a singular control field of a micro instruction and shall specifically exclude the following: assembly language instructions or microprocessor.

Microcode shall mean: a sequence of micro instructions and shall specifically exclude the following: any combination of assembly code instructions.

Microcoded compute engine shall mean: any compute engine which directly uses micro instructions to perform computational tasks.

Passive functional unit shall mean: memory or logic which do not perform computations.

Nested hierarchical levels shall mean: a compute engine coupled to source and sink buses of another compute engine.

We claim:

1. A method of upgrading computational ability from an existing design of a microcoded processor, comprising the steps of:
    providing a first microcoded compute engine and a scratchpad memory coupled thereto between a source bus and a sink bus;
    replacing said scratchpad memory with a nested lower hierarchical level replacement microcoded compute engine; and
    driving said nested lower hierarchical level replacement microcoded compute engine with the same microorders as were used to drive said scratchpad memory.

2. The method of claim 1 wherein said replacement microcoded compute engine is less complex than said first microcoded compute engine.

* * * * *